(12) United States Patent
Hansen et al.

(10) Patent No.: US 11,801,126 B2
(45) Date of Patent: Oct. 31, 2023

(54) DENTAL RESTORATION MOLDS

(71) Applicant: 3M INNOVATIVE PROPERTIES COMPANY, St. Paul, MN (US)

(72) Inventors: James D. Hansen, White Bear Lake, MN (US); Katelyn M. Languell, Eagan, MN (US); Joseph C. Dingeldein, Blaine, MN (US); Lois F. Duerst, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 33 days.

(21) Appl. No.: 16/131,698

(22) Filed: Sep. 14, 2018

(65) Prior Publication Data

US 2019/0083208 A1 Mar. 21, 2019

Related U.S. Application Data

(60) Provisional application No. 62/560,457, filed on Sep. 19, 2017.

(51) Int. Cl.
*A61C 5/77* (2017.01)
*A61C 9/00* (2006.01)
(Continued)

(52) U.S. Cl.
CPC ............ *A61C 13/0004* (2013.01); *A61C 5/77* (2017.02); *A61C 5/88* (2017.02); *A61C 9/0033* (2013.01);
(Continued)

(58) Field of Classification Search
CPC .... A61C 5/30; A61C 5/70; A61C 5/77; A61C 5/80; A61C 5/88; A61C 5/90; A61C 5/85; A61C 9/0033; A61C 5/00; A61C 13/20
See application file for complete search history.

(56) References Cited

U.S. PATENT DOCUMENTS 613,947 A 11/1898 Strout
2,090,904 A * 8/1937 Singer ..................... A61C 5/85
433/148
(Continued)

FOREIGN PATENT DOCUMENTS

CN 204709027 10/2015
DE 10 2009 039 880 3/2011
(Continued)

OTHER PUBLICATIONS

"Cavity." Merriam-Webster.com Dictionary, Merriam-Webster, https://www.merriam-webster.com/dictionary/cavity. Accessed Jan. 4, 2021. (Year: 2021).*
(Continued)

*Primary Examiner* — Jacqueline T Johanas
*Assistant Examiner* — Shannel Nicole Belk

(57) ABSTRACT

In some examples, a tool for forming a dental restoration comprises a preformed mold body configured to provide a patient-specific, customized fit with at least one tooth to be restored of a patient. The mold body is configured to align with a portion of a surface of the at least one tooth, and is configured to combine with the at least one tooth to define a mold cavity encompassing at least a portion of desired tooth structure of the at least one tooth to be restored of the patient. The portion of desired tooth structure defines a transition from a supragingival surface of the at least one tooth to a subgingival surface of the at least one tooth.

24 Claims, 15 Drawing Sheets

(51) Int. Cl.
*A61C 5/88* (2017.01)
*A61C 5/80* (2017.01)
*A61C 13/00* (2006.01)
*A61C 13/20* (2006.01)
*A61C 13/34* (2006.01)

(52) U.S. Cl.
CPC .......... *A61C 13/0019* (2013.01); *A61C 13/20* (2013.01); *A61C 5/80* (2017.02); *A61C 13/34* (2013.01)

(56) References Cited

U.S. PATENT DOCUMENTS

| | | |
|---|---|---|
| 3,224,050 A | 12/1965 | Redtenbacher |
| 3,482,314 A | 12/1969 | Tofflemire |
| 4,433,959 A | 2/1984 | Faunce |
| 4,695,254 A | 9/1987 | Herrell |
| 4,704,087 A | 11/1987 | Dragan |
| 4,713,005 A | 12/1987 | Marshall |
| 4,775,320 A | 10/1988 | Marshall |
| 4,775,430 A | 10/1988 | Tanaka |
| 4,778,386 A | 10/1988 | Spiry |
| 4,881,898 A | 11/1989 | Harvey, Sr. |
| 5,114,341 A * | 5/1992 | Kassel ............. A61C 5/85 433/39 |
| 5,192,207 A | 3/1993 | Rosellini |
| 5,195,889 A | 3/1993 | Von Weissenfluh |
| 5,332,390 A | 7/1994 | Rosellini |
| 5,382,160 A | 1/1995 | Shemet |
| 5,487,663 A | 1/1996 | Wilson |
| 5,803,734 A | 9/1998 | Knutson |
| 5,890,896 A | 4/1999 | Padial |
| 6,482,314 B1 | 11/2002 | Khare |
| 6,659,772 B2 | 12/2003 | Margeas |
| 6,776,614 B2 | 8/2004 | Weichmann |
| 6,821,462 B2 | 11/2004 | Schulman |
| 6,845,175 B2 | 1/2005 | Kopelman |
| 7,027,642 B2 | 4/2006 | Rubbert |
| 7,056,115 B2 | 6/2006 | Phan |
| 7,092,780 B2 | 8/2006 | Ganley |
| 7,162,321 B2 | 1/2007 | Luthardt |
| 7,217,131 B2 | 5/2007 | Vuillemot |
| 7,234,937 B2 | 6/2007 | Sachdeva |
| 7,236,842 B2 | 6/2007 | Kopelman |
| 7,442,040 B2 | 10/2008 | Kuo |
| 7,605,817 B2 | 10/2009 | Zhang |
| 7,689,310 B2 | 3/2010 | Kopelman |
| 7,731,495 B2 | 6/2010 | Eisenberg |
| 7,801,632 B2 | 9/2010 | Orth |
| 7,956,862 B2 | 6/2011 | Zhang |
| 8,194,067 B2 | 6/2012 | Raby |
| 8,255,071 B2 | 8/2012 | Kaigler, Sr. |
| 8,308,478 B2 | 11/2012 | Primus |
| 8,359,114 B2 | 1/2013 | Steingart |
| 8,366,445 B2 | 2/2013 | Vuillemot |
| 8,393,897 B2 | 3/2013 | Clark |
| 8,491,306 B2 | 7/2013 | Raby |
| 8,527,079 B2 | 9/2013 | Kim |
| 8,696,356 B2 | 4/2014 | Hegyi |
| 8,753,114 B2 | 6/2014 | Vuillemot |
| 8,794,965 B2 | 8/2014 | Latiolais |
| 8,882,497 B2 | 11/2014 | Frantz |
| 8,909,363 B2 | 12/2014 | Kopelman |
| 9,308,058 B2 | 4/2016 | Clark |
| 9,375,290 B2 | 6/2016 | Csapo |
| 9,414,895 B2 | 8/2016 | Clark |
| 10,327,873 B2 | 6/2019 | Fisker |
| 10,743,968 B2 | 8/2020 | Fisker |
| 2003/0170593 A1 | 9/2003 | Dorfman |
| 2004/0029068 A1 | 2/2004 | Sachdeva |
| 2005/0042577 A1 | 2/2005 | Kvitrud |
| 2005/0089813 A1* | 4/2005 | Slone ............. A61C 5/85 433/39 |
| 2005/0089814 A1 | 4/2005 | Slone |
| 2006/0008777 A1 | 1/2006 | Peterson |
| 2006/0115792 A1 | 6/2006 | Vuillemot |
| 2006/0122719 A1 | 6/2006 | Kopelman |
| 2008/0153069 A1 | 6/2008 | Holzner |
| 2009/0208896 A1* | 8/2009 | Clark ............. A61C 5/50 433/215 |
| 2010/0159412 A1 | 6/2010 | Moss |
| 2011/0212420 A1 | 9/2011 | Vuillemot |
| 2012/0029018 A1 | 2/2012 | Lee |
| 2013/0130202 A1 | 5/2013 | Vuillemot |
| 2013/0325431 A1 | 12/2013 | See |
| 2014/0205967 A1 | 6/2014 | Csapo |
| 2015/0057782 A1 | 2/2015 | Kopelman |
| 2015/0140517 A1 | 5/2015 | Vuillemot |
| 2015/0250568 A1 | 9/2015 | Fisker |
| 2016/0015246 A1 | 1/2016 | Clausen |
| 2016/0089220 A1 | 3/2016 | Ebert |
| 2016/0143717 A1 | 5/2016 | Samrano |
| 2016/0262860 A1 | 9/2016 | Korten |
| 2017/0119499 A1* | 5/2017 | Clark ............. A61C 5/85 |
| 2017/0273763 A1 | 9/2017 | Fisker |
| 2018/0021113 A1* | 1/2018 | Hansen ............. A61C 13/0004 433/213 |
| 2018/0280116 A1 | 10/2018 | Hansen |
| 2018/0360577 A1 | 12/2018 | Hansen |
| 2019/0083208 A1 | 3/2019 | Hansen |
| 2019/0201165 A1* | 7/2019 | Mishaeloff ............. A61C 5/20 |
| 2019/0298489 A1 | 10/2019 | Dingeldein |

FOREIGN PATENT DOCUMENTS

| | | | |
|---|---|---|---|
| DE | 10 2012 108 217 | 12/2013 | |
| EP | 2 400 914 | 1/2012 | |
| FR | 2500294 | 8/1982 | |
| JP | 2008-119225 | 5/2008 | |
| JP | 2014-171698 | 9/2014 | |
| WO | WO 2007-084727 | 7/2007 | |
| WO | WO 2009/010543 | 1/2009 | |
| WO | WO 2009-042378 | 4/2009 | |
| WO | WO 2009-158231 | 12/2009 | |
| WO | WO 2011-041193 | 4/2011 | |
| WO | WO 2011/156806 | 12/2011 | |
| WO | WO 2016/046308 | 3/2016 | |
| WO | WO 2016/066552 | 5/2016 | |
| WO | WO 2016/094272 | 6/2016 | |
| WO | WO 2016/095272 | 6/2016 | |
| WO | WO-2016094272 A1 * | 6/2016 | ......... A61C 13/0004 |
| WO | WO 2017-106419 | 6/2017 | |
| WO | WO 2017-106431 | 6/2017 | |
| WO | WO-2017106431 A1 * | 6/2017 | ......... A61C 13/081 |
| WO | WO 2018/022616 | 2/2018 | |
| WO | WO 2018/022617 | 2/2018 | |
| WO | WO 2020/033528 | 2/2020 | |
| WO | WO 2020/033532 | 2/2020 | |
| WO | WO 2020/058855 | 3/2020 | |

OTHER PUBLICATIONS

"Smooth." Merriam-Webster.com Dictionary, Merriam-Webster, https://www.merriamwebster.com/dictionary/smooth. Accessed Oct. 13, 2021. (Year: 2021).*

"Incisal." Merriam-Webster.com Dictionary, Merriam-Webster, https://www.merriamwebster.com/dictionary/incisal. Accessed Oct. 14, 2021. (Year: 2021).*

"Bite-perf: the art of occlusal duplication", [retrieved form the internet on Aug. 8, 2017], URL <www.biteperf.es>, 2pgs.

"Bite-perf: Training kit (English)", youtube, [retrieved form the internet on Aug. 8, 2017], URL <http://www.youtube.com/watch?v=tCw45t_ntrA>, 1 pg.

3M Oral Care lecture, 2015, 16pgs_.

Conte, "A Clear PVS Matrix Technique for the Placement of Posterior Direct Composites", Dentistry Today, Apr. 30, 2008, 5pgs.

International Search Report for International Application No. PCT/IB2018/057078, dated Nov. 21, 2018, 7 pages.

(56) References Cited

OTHER PUBLICATIONS

"Cavity," Merriam-Webster.com Dictionary, Merriam-Webster, https://www.merriam-webster.com/dictionary/cavity. Accessed Jan. 4, 2021, 14 pages. (2021).

* cited by examiner

DENTAL RESTORATION MOLDS

TECHNICAL FIELD

The present disclosure relates to dental restorations.

BACKGROUND

A dental restoration, or a dental filling, utilizes a restorative dental material to improve function, integrity, and morphology of missing or irregular tooth structure. For example, a dental restoration may be used to restore missing tooth structure due to congenital discrepancies, following external trauma, or as part of a restorative treatment for dental caries, or tooth decay.

Restorative dentistry may also be an aesthetic treatment to improve appearance of teeth by, for example, altering their shape and/or optical properties (e.g., shape and/or translucency) by, for example, applying a veneer, enlarging an undersized tooth, managing position or contour of adjacent soft tissues, lessening or removing a gap (diastema), and/or resolving the appearance of malposition.

Restorative dentistry may also be used to adjust the biting or chewing function of teeth, to affect tooth function, and/or other aspects of overall oral health such as temporomandibular joint (TMJ) disorders, periodontal involvement, gingival recession or as part of a larger plan to construct a healthy and stable oral environment.

In some examples, restorative dentistry may include removing tooth structure, such as drilling decay from an infected tooth or reshaping teeth by removing undesired tooth structure (e.g., which may be referred to as "preparing" or "recontouring" the tooth) and then using relatively simple tools and a relatively high level of craftsmanship to isolate, retract, fill and contour the finished restoration. In other examples, the tooth may not need to be prepared or recontoured prior to isolating, retracting, filling, and contouring the finished restoration.

SUMMARY

This disclosure describes devices, systems, and techniques for molding (e.g., form using a mold, shaping, or contouring) restorative dental material to define a transition from a supragingival surface of a tooth to a subgingival surface the tooth. In some examples, a dental restoration tool includes a mold body that, together with a tooth of a particular patient, defines a mold cavity configured to receive the restorative dental material. The restorative dental material may be introduced into the mold cavity and cured to define the transition from the supragingival surface of the tooth to the subgingival surface the tooth. The dental restoration tool is custom designed and preformed for a particular tooth (or set of teeth) of a particular patient. In some examples, such custom tools may be produced using three-dimensional printing techniques. Tools may also be produced by other methods of creating physical objects from digital data, such as CAD/CAM milling. In other examples, tools may be produced using vacuum forming techniques.

In one example, a tool for forming a dental restoration comprises a preformed mold body configured to provide a patient-specific, customized fit with at least one tooth to be restored of a patient, the mold body configured to align with a portion of a surface of the at least one tooth, the mold body being configured to combine with the at least one tooth to define a mold cavity encompassing at least a portion of desired tooth structure of the at least one tooth to be restored of the patient, wherein the portion of desired tooth structure of the at least one tooth to be restored defines a transition from a supragingival surface of the at least one tooth to a subgingival surface of the at least one tooth.

In another example, a method of designing a tool for forming a dental restoration of a tooth comprises receiving, by one or more processors, three-dimensional scan data of a supragingival tooth structure of a patient; receiving, by one or more processors, information relating to a subgingival tooth structure of the patient; and designing, by the one or more processors, a tool for forming the dental restoration of the tooth based on the three-dimensional scan data of the supragingival tooth structure of the patient, the information relating to the subgingival tooth structure of the patient, and the desired tooth structure of the at least one tooth to be restored of the patient, wherein the tool comprises a preformed mold body configured to provide a patient-specific, customized fit with the at least one tooth to be restored of the patient, the mold body configured to align with a portion of a surface of the at least one tooth, the mold body being configured to combine with the at least one tooth to define a mold cavity encompassing at least a portion of desired tooth structure of the at least one tooth to be restored of the patient, wherein the portion of desired tooth structure of the at least one tooth to be restored defines a transition from a supragingival surface of the at least one tooth to a subgingival surface of the at least one tooth.

In another example, a method of forming a dental restoration comprises positioning a preformed mold body over at least one tooth to be restored of a patient, the mold body configured to provide a patient specific, customized fit with the at least one tooth, the mold body configured to align with a portion of a surface of the at least one tooth, the mold body being configured to combine with the at least one tooth to define a mold cavity encompassing at least a portion of desired tooth structure of the at least one tooth to be restored of the patient, wherein the portion of desired tooth structure of the at least one tooth to be restored defines a transition from a supragingival surface of the at least one tooth to a subgingival surface of the at least one tooth; introducing restorative material into the mold cavity; curing the restorative material; and removing at least a portion of the mold body from the at least one tooth.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1A:
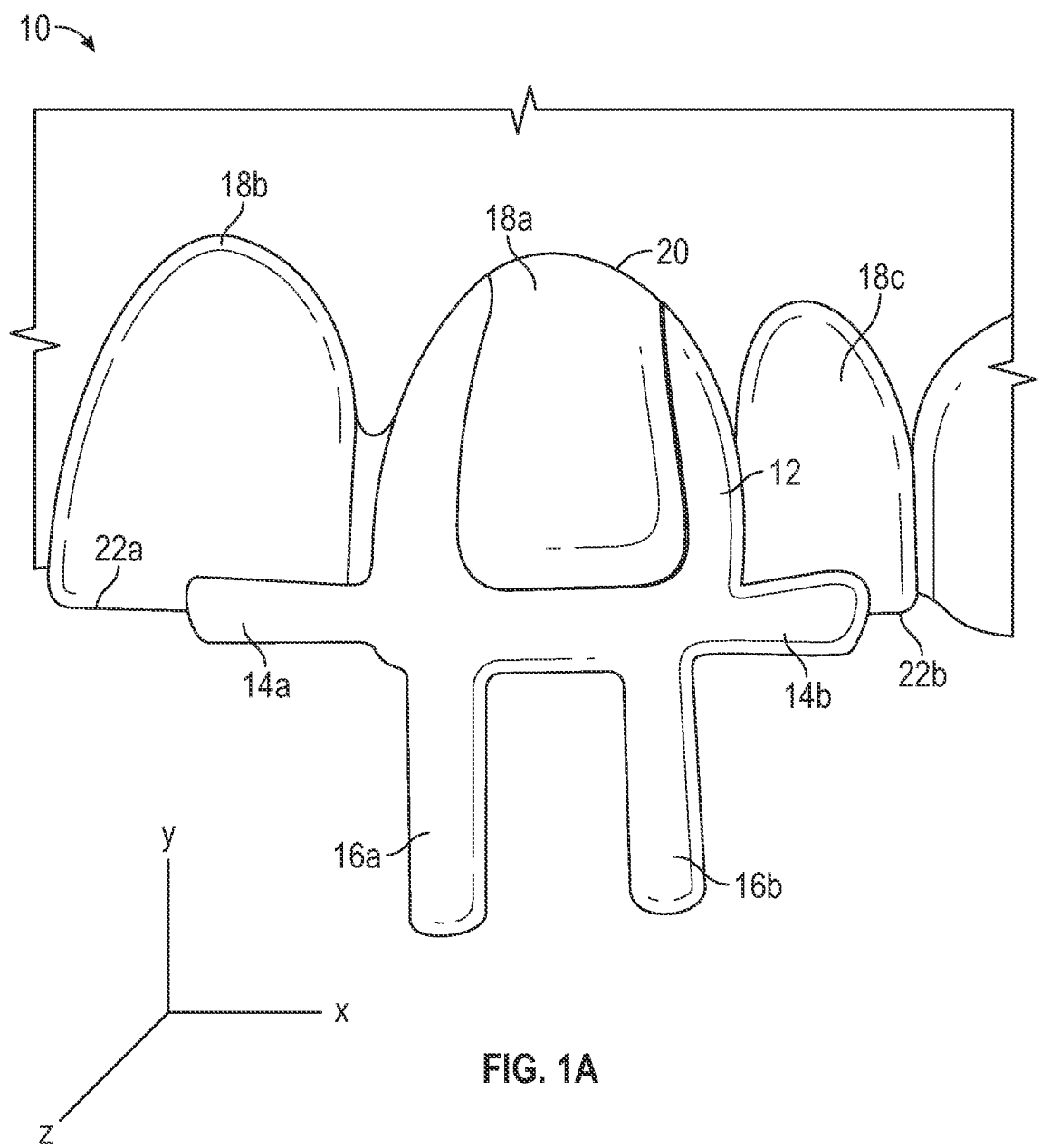
FIGS. 1A and 1B are front views of an example customized tool for forming a dental restoration on a tooth to be restored, the tool including at least one mold body.

Restorative dentistry may be used to add tooth structure to a patient's dentition, e.g., to an existing tooth, in order to improve at least one of function, integrity, aesthetics, or morphology of missing or irregular tooth structure. For example, restorative dentistry can be an aesthetic treatment to improve appearance of teeth by, for example, altering their shape and/or optical properties (e.g., shape, color and/or translucency), which can be achieved using any suitable technique, such as by applying a veneer, managing position or contour of adjacent soft tissues, lessening or removing a gap (diastema), adjusting an emergence profile, and/or resolving the appearance of malposition of one or more teeth. As another example, restorative dentistry may be used to adjust the biting or chewing function of teeth to affect tooth function and/or other aspects of overall oral health such as temporomandibular joint (TMJ) disorders, periodontal involvement, gingival recession, or as part of a larger plan to construct a healthy and stable oral environment.

In some cases, a dental restoration process includes drilling decay from an infected tooth or reshaping teeth by removing undesired tooth structure (e.g., which may be referred to as "preparing" or "recontouring" the tooth) and then using tools and craftsmanship to manually isolate, retract, fill, and contour the finished restoration. In other cases, the dental restoration may be formed without the need to significantly prepare or recontour the tooth prior to manually isolating, retracting, filling, and contouring the finished restoration.

Different techniques may be used to isolate the dental restoration site. Quality isolation of the dental restoration site via a rubber dam can be cumbersome and may be skipped for less effective isolation via cotton rolls, which may increase the risk of contamination, reduce longevity of the restoration, or both. Retraction of soft and hard tissue may include manipulation of cords, wedges, and matrix bands. Imperfect retraction techniques may result in contamination, difficulty in achieving proper tooth and/or gingival contours and symmetry, finishing and/or polishing in interproximal areas, poorly adapted contacts, or any combination thereof.

In some examples, forming a dental restoration that includes a tooth structure that extends from a supragingival surface of a tooth to a subgingival surface of a tooth, which may be referred to as an emergence profile, may be particularly challenging. For example, with little geometrical guidance available on a surface of the tooth to form the emergence profile of the tooth, a practitioner may use an imprecise method of using a standard, non-customized mold (e.g., generic to a plurality of patients and not designed based on the specific geometry of a particular patient's tooth) or dental tool and manually adjust the positioning and/or shape of the mold or dental tool while simultaneously applying the restorative dental material to the tooth. As an example, a practitioner may select a non-customized mold based on a type of tooth to be restored, e.g., an incisor, and/or based on the size of the tooth of the patient to be restored, and then manually adjust the positioning and/or shape of the mold while the mold is positioned over the tooth of the patient. This process may require a relatively high degree of skill and/or level of training, and yet may still result in a large degree of variability of dental restorations across practitioners and/or patients. Additionally, or alternatively, such an imprecise method may result in less than desirable emergence profiles, e.g., improper contours across the supragingival surface of the tooth to the subgingival surface of the tooth. Such improper contours may lead to aesthetic imperfections, ledges, appearances of black triangles between teeth due to the unfilled spaces between the teeth, and/or poor support for the patient's gingiva, which may result in tooth sensitivity, plaque traps, premature deterioration of the gingiva, and/or patient dissatisfaction. In some cases, this process of forming the tooth structure that extends from a supragingival surface to a subgingival surface of a tooth in such an ad hoc manner may be time consuming and may also result in return visits for adjustments to the dental restoration or retreatment.

In yet another example, a practitioner may utilize successive layering and building up of restorative material directly on the tooth to be restored to create the desired emergence profile. However, such a technique may also require a high level of skill and may be relatively imprecise. In other examples, a practitioner may forgo this process altogether in lieu of more expensive and/or invasive dental procedures, such as, for example, applying a laboratory fabricated dental restoration.

As described herein, preformed, custom molds are used to facilitate restoration of tooth structure, including a tooth structure that extends from a supragingival surface to a subgingival surface. The custom molds for forming the tooth structure including an emergence profile of the tooth may help address one or more of the challenges of forming the emergence profile discussed above.

In some examples, a custom mold includes a patient-specific mold body configured to be positioned over a patient's tooth structure and, alone or together with existing tooth structure, the mold body defines a mold cavity configured to receive restorative material. As used herein, "positioned over" and "positioned on" describe positioning the mold body in the mouth of the patient so that the mold body is properly aligned with the tooth to be restored to define the mold cavity configured to receive restorative material and to form desired tooth structure of the particular patient. In some examples, positioning the mold body over or on the tooth to be restored may be facilitated by gravity, injection forces, securing the mold body to the tooth, or the like. The configuration of the mold cavity corresponds to the desired configuration of the dental restoration, such as a desired contour of an emergence profile from a supragingival surface of a tooth to a subgingival surface of a tooth. A dental restoration may be formed by positioning the preformed, patient-specific mold body in a patient's mouth at the desired location for the dental restoration, introducing a restorative material into the mold cavity before or after positioning the mold body in the patient's mouth, and curing the restorative material while the mold is still in place in the mouth. The cured restorative material may define the dental restoration. In other examples, the mold body may be formed at least in part by the restorative material. For example, the mold body may be at least partially manufactured (e.g., three-dimensionally printed) from a restorative material, which, after being placed over the patient's tooth structure, can be cured to define at least a portion of the dental restoration.

The customized tools described herein may include one or more features designed to provide predefined, patient-specific dental restorations of an emergence profile from a supragingival surface of at least one patient's tooth to a subgingival surface of at least one patient's tooth. The customized tools described herein may further include features to improve functionality of dental restoration tools, and ease of use of the tools.

The customized tools described herein are not generic molds for use with multiple patients and that simply reflect a general shape of desired tooth structure, but are instead designed to reflect the desired tooth structure of a particular patient. For example, the customized tools described herein are not merely standard or generalized molds, e.g., molds based on a specific tooth type, size, or the like, but rather are preformed to provide an individualized fit with one or more teeth of a particular patient. In this way, the customized tools described herein include patient-specific, predefined mold bodies configured to provide a customized fit with one or more teeth of the individual patient to define a predetermined, patient-specific mold cavity encompassing the desired tooth structure of the individual patient.

The customized tools described herein are designed to mate with a particular patient's particular tooth or teeth in order to define a predetermined, patient-specific mold cavity. The customized tools are predefined and preformed in that they are formed to have the proper configuration for achieving the desired tooth structure prior to being placed over the one or more teeth of the patient. Therefore, the customized tools described herein may not need to be manually adjusted while on the tooth of the patient in order to reflect the desired tooth structure of the patient, may require less adjustment to the dental restoration after removal of the tool from the patient's mouth, ease the use of the tool, or the like. Additionally, or alternatively, the customized tools described herein allow a practitioner to design, preform, and address the needs of particular patients on an individual, case-by-case basis, rather than by manually manipulating a standard, non-customized matrix or mold in an attempt to create a desired tooth structure in an ad hoc manner.

In some examples, a customized tool described herein may be digitally designed. For example, a customized tool may be designed using a three-dimensional (3D) model of the particular patient's actual tooth structure (e.g., obtained from an intraoral scan of all or part of the patient's dentition or scanning of a conventional impression or model), rather than a model that is general to a class of patients. The 3D model can be a physical model or a virtual model, depending on the manufacturing process used to form the tool for forming a dental restoration. The customized tool can be, for example, manufactured from the digital data using an additive technique, such as 3D printing, a subtractive technique, such as computer-aided design/computer-aided manufacturing (CAD/CAM) milling, a vacuum forming technique, or the like. In other examples, the customized tool may be designed using a more generic tooth structure model (virtual or physical), which is not generated based on patient-specific data, and then used to determine a suitable emergence profile for a particular patient. For example, the more generic tooth structures may be categorized in a library, and characteristics of the generic tooth structures, e.g., size, geometry of tooth structure, or the like, may be used to determine a suitable emergence profile for a particular patient. The design of the desired tooth structure of the particular patient are then used to preform the patient-specific, customized tool, e.g., prior to positioning the tool in the mouth of the patient to create the dental restoration. Even in examples in which characteristics of a non-patient-specific tooth structure is used to determine a suitable emergence profile for a particular tooth of a particular patient, other characteristics of the dental tool may be patient specific, such as features that mate with the tooth of the patient in order to properly fit the dental tool over the tooth (or teeth) to define a mold cavity.

In some examples, the customized tool for a dental restoration may include a mold designed based on the 3D model of the desired patient's tooth structure, and may include additional features to provide advantages over molds that are formed based simply on the 3D scan, a wax mold, or other molds based simply on the shape of the anatomy and/or desired tooth structure of the patient. The disclosed mold and techniques may facilitate patient-specific, high quality dental restorations with reduced time and/or skill requirements compared to conventional dental restoration techniques and/or may facilitate high quality dental restorations with improved quality, reduced improper contours, and/or reduced time and/or skill requirements compared to other molding techniques.

Figure 1B:
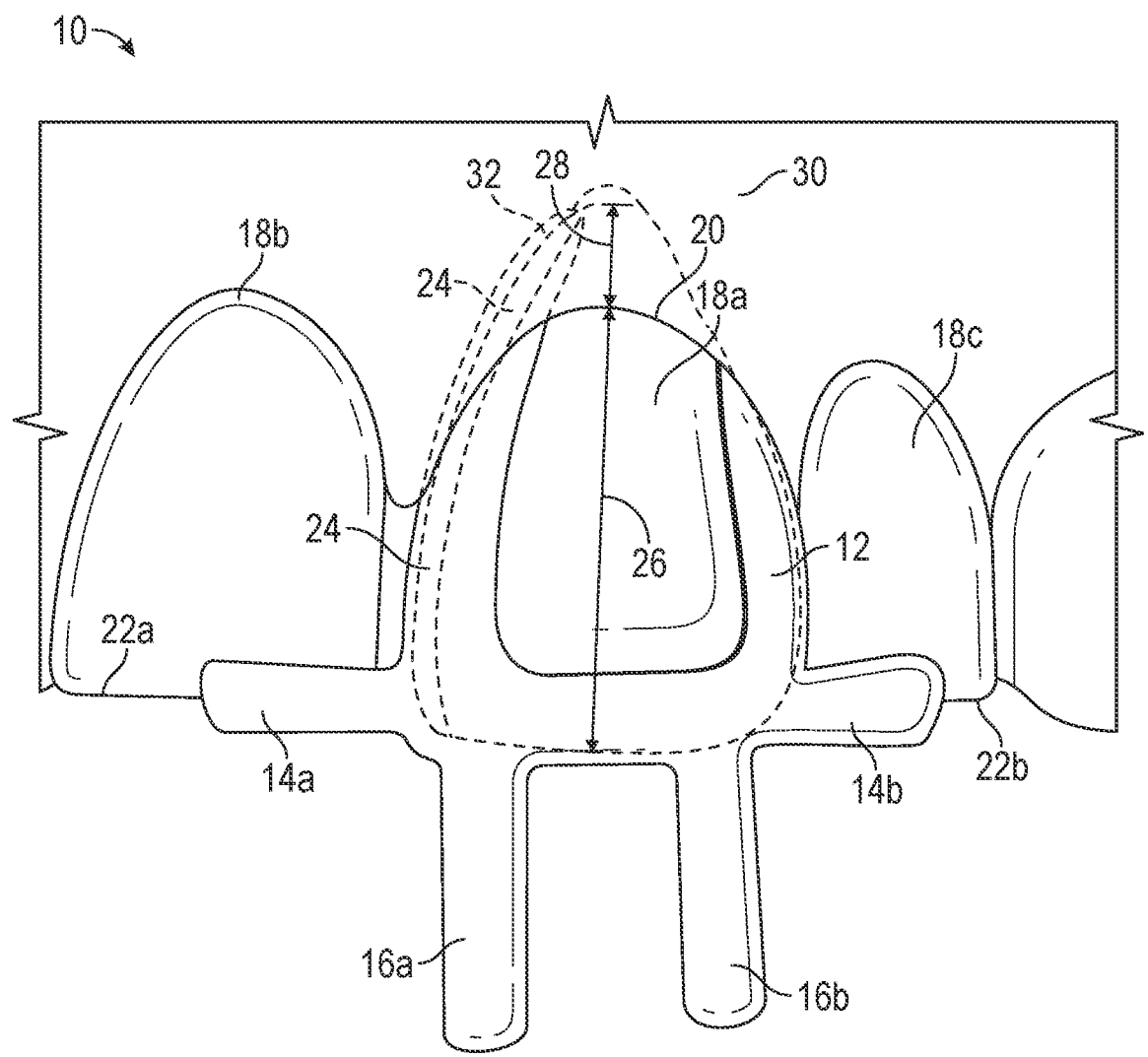

FIGS. 1A and 1B are front views of an example customized tool 10 for forming a dental restoration on a tooth to be restored, the tool including at least one mold body 12. Mold body 12 provides a customized fit with at least one tooth 18a, 18b, and/or 18c (collectively, "teeth 18") of a patient. For example, as shown in FIGS. 1A and 1B, mold body 12 is specifically designed to fit over (e.g., mate with) at least one of tooth 18a, 18b, and/or 18c. Mold body 12 may be configured to align with a portion of a surface tooth 18a, 18b, and/or 18c to be restored, such as, for example, a lingual, a facial, interproximal, or an incisal/occlusal surface of tooth 18a, 18b, and/or 18c. In the example of FIG. 1A, the tooth to be restored is tooth 18a. The surface of tooth 18a to be restored and aligned may, for example, be defined by existing tooth structure or by the desired tooth structure to be formed using mold body 12. In other examples, a tooth other than tooth 18a may be the tooth to be restored.

Mold body 12 is configured to combine with tooth 18a of the patient to define a mold cavity 24 encompassing at least a portion of desired tooth structure of tooth 18a to be restored. For example, in the illustrated example of FIG. 1B, mold body 12 may combine with tooth 18a to define mold cavity 24 encompassing a transition from a supragingival surface 26 of tooth 18a to a subgingival surface 28 of tooth 18a. Although FIG. 1B shows supragingival surface 26 and subgingival surface 28 on a facial surface of tooth 18a, supragingival surface 26 and subgingival surface 28 refer generally to the surfaces of tooth 18a relative to gingival margin 20, and may be on any side of tooth 18a, such as, for example, a lingual or an interproximal surface of tooth 18a.

In some examples, the desired tooth structure of tooth 18a to be restored defines a tooth structure that tapers from supragingival surface 26 of tooth 18a to subgingival surface 28 of tooth 18a. Additionally, or alternatively, the portion of desired tooth structure of tooth 18a to be restored may include at least a portion of an interproximal surface of tooth 18a, such as, for example, a surface of tooth 18a between teeth 18a and 18b and/or between teeth 18a and 18c.

In some examples, mold body 12 may be configured to define more than one mold cavity 24. In some such examples, the additional mold cavities may also encompass a transition from supragingival surface 26 of tooth 18a to subgingival surface 28 of tooth 18a. For example, mold body 12 may additionally define a mold cavity similar to mold cavity 24, but on the opposite side of tooth 18a. In other examples, the one or more additional mold cavities may encompass other desired tooth structures, such as, for example, an interproximal surface of tooth 18a, a facial surface of tooth 18a, and/or a lingual surface of tooth 18a. In yet another example, mold body 12 may be configured to combine with teeth 18 to define one or more mold cavities to encompass desired tooth structure for tooth 18b and/or 18c to be restored in addition, or alternatively, to tooth 18a to be restored.

Gingiva 30 of the patient defines the gingival margin 20 of the patient. For example, gingiva 30 may define gingival margin 20 where gingiva 30 ends and teeth 18 are visible. Gingival margin 20 of the patient may demarcate supragingival surface 26 and subgingival surface 28 of tooth 18a. For example, supragingival surface 26 of tooth 18a may be the portion of tooth structure of tooth 18a above gingival margin 20, and subgingival surface 28 of tooth 18a may be the portion of tooth structure of tooth 18a below gingival margin 20. In other words, supragingival surface 26 may be the visible tooth structure of tooth 18a, and subgingival surface 28 may be the tooth structure of tooth 18a under gingiva 30. For example, supragingival surface 26 may include the crown of tooth 18a, and subgingival surface 28 may include the root, the neck, or another structure of tooth 18a under gingiva 30.

In some examples, the tooth structure that transitions from supragingival surface 26 of tooth 18a to subgingival surface 28 of tooth 18a may be referred to as an emergence profile, e.g., because it defines a tooth structure that emerges from a subgingival region to a supragingival region, or may interchangeably be referred to as defining an emergence profile of tooth 18a. In some examples, an emergence profile that does not include step-like shapes, ledges, and/or sharp transitions, may help prevent aesthetic imperfections, appearances of black triangles between adjacent teeth due to the unfilled spaces between the teeth, and/or poor support for gingiva 30 of the patient. In turn, the likelihood of tooth sensitivity, plaque traps, features that can catch dental floss, e.g., a ledge, premature deterioration of the gingiva, and/or patient dissatisfaction may be decreased.

One or more desirable characteristics of an emergence profile that may help correct aesthetic imperfections, provide adequate support for gingiva 30 and papilla (e.g., a portion of gingiva 30 between two adjacent teeth 18), or otherwise promote post-operative healing and maintenance of a stable oral environment include a smooth taper from supragingival surface 26 of tooth 18a to subgingival surface 28 of tooth 18a (e.g., tooth structure extending from supragingival surface 26 to subgingival surface 28 having minimal or no ledges or sharp transitions relative to gingiva 30), being flush with both supragingival surface 26 and subgingival surface 28 of tooth 18a, closely mimicking a natural contour of an emergence profile (e.g., in which the natural contour is proper), or the like. Further, in some examples, the emergence profile of tooth 18a may be formed using mold body 12 to form an adequate papilla by helping push gingiva 30 between tooth 18a and the adjacent tooth in order to help close a space between the adjacent teeth. In this way, the emergence profile may be configured to help reduce the appearance of a black triangle between tooth 18a and an adjacent tooth.

In examples in which mold body 12 is configured to be used to form an emergence profile of tooth 18a, mold cavity 24 defined by mold body 12 defines one or more characteristics of the desired emergence profile. Example characteristics of a desired emergence profile include a depth (e.g., as measured in the direction of the y-axis of FIG. 1A from gingival margin 20 in the direction of gingiva 30) that does not contact the periodontal ligament within gingiva 30 (e.g., about 3 mm in some examples); a width (e.g., as measured in the direction of the x-axis of FIG. 1A between adjacent teeth 18a and 18b or 18c); or a height (e.g., as measured in the direction of the y-axis of FIG. 1A from gingival margin 20 in the direction of the incisal/occlusal surface of tooth 18a); and an angle of taper (e.g., from supragingival surface 26 of tooth 18a to subgingival surface 28 of tooth 18a). Additionally, or alternatively, a desired emergence profile may provide support for the papilla without excessively constraining blood flow to the papilla or other portions of gingiva 30. In some examples, excessively constraining blood flow to the papilla or other portions of gingiva 30 can lead to recession of the papilla and/or gingiva 30.

In some examples, a desired emergence profile, e.g., the emergence profile to be formed using customized tool 10, may be based on one or more of a geometry of the patient's tooth structure, a mirror image of a tooth contralateral to tooth 18a to be restored, data relating to standard teeth, dental models, standard teeth having proper emergence profiles, or the like. For example, the geometry of the patient's tooth structure may be used to build a wax dental model of the patient's tooth structure and/or gingiva. The wax dental model may allow a practitioner to build up the desired emergence profile for the individual patient starting from the patient's existing tooth structure, which in turn may be able to be scanned and manufactured. In another example, data relating to standard teeth and the emergence profiles of said standard teeth, may be able to be digitally or physically scaled, altered, or otherwise adjusted to better represent the desired tooth structure of the individual patient to form mold body 12 encompassing the desired emergence profile.

In some examples, a computing device executing computer software may be used to model and/or design the desired dental restoration for the particular patient. Example software programs include 3D dental restorative design programs available from 3Shape (Copenhagen, Denmark), Exocad® (Darmstadt, Germany), and Dental Wings™ (Quebec, Canada). The dental restoration resulting from using the aid of a computing device may be further customized and/or adjusted to a practitioner's preferences and/or to fit additional patient needs. For example, a practitioner may choose to further customize tool 10 formed using a digital model of a tooth structure to lessen the appearance of black triangles, adjust the support of gingiva 30 of the patient, or the like. In some examples, machine learning techniques may be applied to computer-generated dental restoration models in order to improve the dental models based on outcome of previous restorations, to better conform to a practitioner's preferences, or the like. For example, a practitioner may prefer thicker emergence profiles than those generated by the computer dental restoration models, such as to provide additional support to gingiva 30. In some such cases, the machine learning technique may determine an average thickness the practitioner adds to the computer-generated emergence profile, and may adjust the computer-generated dental models to automatically add the average thickness and generate the desired emergence profile for the individual patient. In this way, the practitioner may have to adjust the computer-generated dental models less often or for less time than some computer-generated dental restoration models that do not have machine learning techniques applied.

In some examples, a practitioner may choose a standard mold body 12 from a set of standard mold bodies, and then customize the standard mold body 12 to encompass the desired tooth structure of the particular patient. A standard set of mold bodies may allow a practitioner to provide a customized mold body for a specific patient's dental restoration, but result in less time and/or resources being spent on completely modeling the patient's entire tooth and/or gingival structure.

As described above, preformed mold body 12 combines with tooth 18a of the patient to define mold cavity 24 encompassing a desired tooth structure that extends from supragingival surface 26 of tooth 18a to subgingival surface 28 of tooth 18a. In some examples, mold body 12 is configured to contact at least a portion of subgingival surface 28 of tooth 18a to concentrate sealing pressure at at least a portion of a perimeter of mold cavity 24. For example, as shown in FIG. 1B, mold body 12 includes subgingival portion 32 that contacts at least a portion of subgingival surface 28 of tooth 18a to concentrate sealing pressure at at least a portion of a perimeter of mold cavity 24. The concentrated sealing pressure of mold body 12 with at least a portion of subgingival surface 28 may allow the finished dental restoration to form a hermetic or a substantially hermetic seal with subgingival surface 28. In some examples in which mold body 12 is not configured to contact at least a portion of subgingival surface 28 to concentrate sealing pressure, food particles and/or plaque may become entrapped between the finished dental restoration formed using mold body 12 and subgingival surface 28 of tooth 18a, which may be difficult to see and/or remove. In some cases, the entrapment of food particles and/or plaque may lead to patient discomfort, premature failure of the dental restoration, and/or tooth decay.

In some examples, mold body 12 is configured to extend between a portion of gingiva 30 of the patient and subgingival surface 28 of tooth 18a to be restored. For example, mold body 12 may be thin enough, e.g., in a direction approximately normal to the surface of tooth 18a that mold body 12 is configured to align with, to fit into a gingival sulcus of the patient, e.g., a space between supragingival surface 26 and gingival margin 20, and extend between gingiva 30 and subgingival surface 28 and into a periodontal pocket corresponding to tooth 18a. In this way, gingiva 30 of the patient may not need to be displaced using a dental tool separate from mold body 12, e.g., using wedging tools, retraction cords, or the like, in order to position mold body 12 over tooth 18a to define mold cavity 24 that encompasses the desired tooth structure of the individual patient. In some examples, not displacing gingiva 30 may help a practitioner create the desired final dental restoration or close to the desired final dental restoration with fewer adjustments, such as, for example, additional time and/or return visits of the patient to add, remove, or otherwise alter the restored tooth structure, than some other dental restoration techniques that use a separate dental tool to displace gingiva 30. For example, a practitioner may be able to visualize and mitigate the appearance of black triangles during formation of the dental restoration rather than doing so after removal of the separate dental tool.

In other examples, a practitioner may use both mold body 12 configured to extend between a portion of gingiva 30 of the patient and subgingival surface 28 of tooth 18a to be restored and a separate dental tool to displace at least a portion of gingiva 30 and/or displace tooth 18b or 18c adjacent to tooth 18a to be restored. Displacing a portion of gingiva 30 and/or tooth 18b or 18c adjacent to tooth 18a to be restored may allow a practitioner to more easily see the perimeter of mold cavity 24, more easily see and/or remove flash, and/or create more space between tooth 18a and tooth 18b or 18c to form the dental restoration.

In other examples, mold body 12 may be configured to displace a portion of gingiva 30 of the patient proximate to tooth 18a to be restored when mold body 12 is positioned over tooth 18a to define mold cavity 24. For example, mold body 12 may be configured to push gingival margin 20 in the direction of subgingival surface 28, which may expose a portion of subgingival surface 28 in some examples. As another example, mold body 12 may be configured to push gingiva 30 of the patient in a direction away from tooth 18a and towards adjacent tooth 18b or 18c in order to better expose the current tooth structure that transitions from subgingival surface 28 to supragingival surface 26 of tooth 18a. In some examples, the displacement of a portion of gingiva 30 of the patient by tool 10 may allow a practitioner to more easily see the perimeter of mold cavity 24 to aid in correct placement of mold body 12 on tooth 18a.

Exposing a portion of subgingival surface 28 by displacing gingiva 30 using tool 10 may also allow a practitioner to more easily see and remove any flash formed during finishing of the restoration. Flash may be, for example, excess restorative material outside of mold cavity 24, e.g., restorative material that may leak from seams of mold cavity 24 and/or the junction of the mold body 12 with tooth 18a and flow into unintended and often undesirable areas of a patient's mouth.

Additionally, or alternatively, mold body 12 may include a wedging member (not shown in FIGS. 1A and 1B) configured to displace a portion of gingiva 30 of the patient proximate to tooth 18a and/or displace a tooth 18b or 18c adjacent to tooth 18a to be restored when mold body 12 is positioned over tooth 18a to define mold cavity 24. For example, the wedging member may be configured to push gingival margin 20 in the direction of subgingival surface 28 and/or in a direction away from tooth 18a and towards adjacent tooth 18b to expose a portion of subgingival surface 28. In this way, a practitioner may be able to see the perimeter of mold cavity 24 to aid in correct placement of mold body 12 over tooth 18a. Additionally, or alternatively, exposing a portion of subgingival surface 28 may also allow a practitioner to more easily see and remove any flash formed during finishing of the restoration. In some examples, the wedging member may additionally, or alternatively, be configured to separate one of tooth 18b or 18c adjacent to tooth 18a to be restored. For example, the wedging member 36 (shown in FIG. 2C) may be configured to separate tooth 18b and tooth 18a to be restored to form a dental restoration defining a desired interproximal surface of tooth 18a, e.g., the surface of tooth 18a adjacent to tooth 18b in the example shown in FIGS. 1A and 1B. The wedging member may function the same as or similar to the example in which mold body 12 itself is configured to displace a portion of gingiva 30.

In some examples, mold body 12 may include varying thicknesses, and the thicknesses of various parts of mold body 12 may be selected to provide mold body 12 with the desired level of rigidity in some portions to permit introduction mold body 12 to hold its form when restorative material is introduced into the mold cavity, as well as provide mold body 12 with the desired level of flexibility in other portions to engage with tooth 18a to be restored. For example, in examples in which mold body 12 is configured to extend between a portion of gingiva 30 of the patient and subgingival surface 28 of tooth 18a to be restored, the portion of mold body 12 that extends between gingiva 30 and subgingival surface 28 may be relatively thinner e.g., in a direction approximately normal to the surface of tooth 18a that mold body 12 is configured to align with, than the rest of mold body 12. In some such examples, the portion of mold body 12 that extends between gingiva 30 of the patient and subgingival surface 28 of tooth 18a may be about 50 micrometers (μm) thick. In this way, mold body 12 may fit into the gingival sulcus of the patient, while also being relatively rigid. Additionally, or alternatively, the thinner portion of mold body 12 may help prevent the formation of ledges in the final dental restoration and/or provide a smoother transition from subgingival surface 28 to supragingival surface 26.

In examples in which mold body 12 is configured to displace a portion of gingiva 30 of the patient proximate to tooth 18a to be restored, the portion of mold body 12 that contacts gingiva 30 may relatively thicker, or at least as thick as, the rest of mold body 12. In some cases, the additional thickness of mold body 12 may displace gingiva 30 easier than a mold body that is thinner.

In any case, mold body 12, or at least a portion of mold body 12, may be sufficiently thick such that mold body 12 is relatively rigid, holds the shape of the desired tooth structure of the individual patient, and is less likely to be inadvertently altered, e.g., due to the practitioner handling mold body 12.

In some examples, mold body 12 may include one or more registration members 14a, 14b (collectively, "registration members 14") configured to help align mold body 12 with tooth to be restored 18a. In the example shown in FIGS. 1A and 1B, registration members 14 are configured to align with and mate with at least a portion of an occlusal or an incisal surface of tooth 18a, 18b, and/or 18c of the patient when mold body 12 is properly positioned over teeth 18a, 18b, and 18c. For example, when mold body 12 is properly positioned over teeth 18a, 18b, and 18c, registration member 14a may align with and mate with an occlusal/incisal surface 22a of tooth 18b, and registration member 14b may align with and mate with an occlusal/incisal surface 22b of tooth 18c. In some examples, registration members 14 may be configured to align with at least a portion of an occlusal or an incisal surface of tooth 18a to be restored instead of or in addition to the adjacent teeth 18b, 18c. Additionally, or alternatively, registration members 14 may align with and mate with structures other than surfaces of teeth 18. For example, registration members 14 may be configured to align with and mate with a lingual matrix or a transpalatal bar in the mouth of the patient. In another example, registration members 14 may align with any other fixed reference point in the mouth of the patient, such as, for example, an implant, an implant abutment, a temporary anchorage device, an orthodontic appliance, or the like. Registration members 14 may stabilize mold body 12 on teeth 18, help ensure that mold body 12 is properly fit over the correct teeth 18, and/or help guide the practitioner in positioning mold body 12 over teeth 18.

In some examples, mold body 12 may include a release film (e.g., polytetrafluoroethylene (PTFE), polyethylene terephthalate glycol-modified (PETG), Saran Wrap or another releasable material) configured for placement on one or more surfaces of mold body 12, including, for example, the surface of mold cavity 24, to facilitate release of restorative material from the surface of mold body 12. For example, a practitioner can apply the release film mold body 12 prior to bringing mold body 12 into contact with restorative material in mold cavity 24. In addition to, or instead of the release film, mold body 12 may include a coating on one or more surfaces of mold body 12 to facilitate release of restorative material from the surface of mold body 12. The coating may be, for example, a lubricious coating, such as PTFE, a thin layer of petroleum jelly, or the like.

In some examples, mold body 12 may selectively include a release film or a coating so that a portion of mold body 12 does not include the release film or coating. For example, in an example in which mold body 12 is formed at least in part by restorative material, the part of mold body 12 formed by the restorative material may not include the release film or coating, and the part of mold body 12 not formed by the restorative material may include the release film or coating. In this way, the part of mold body 12 formed by the restorative material may adhere to the surface of tooth 18a to form the desired tooth structure of the individual patient better than the part of mold body 12 not formed by the restorative material that is to be removed from tooth 18a.

In some examples, mold body 12 may include one or more structural elements that help a practitioner grasp and move mold body 12 relative to teeth 18 and/or increase the rigidity of mold body 12. For example, mold body 12 includes one or more gripping members 16a, 16b (collectively, "gripping members 16") that are each configured to provide a handling mechanism for a practitioner, e.g., the hand of the practitioner or a tool manipulated by the practitioner. At least one of positioning mold body 12 over teeth 18, removing mold body 12 from teeth 18, inserting mold body 12 between a portion of gingiva 30 and subgingival surface 28, and/or displacing a portion of gingiva 30 may be facilitated by using the one or more gripping members 16 at least because gripping members 16 may allow the practitioner to handle mold body 12, put force on mold body 12, remove mold body 12 from tooth 18a, push or pull mold body 12, or the like with greater ease than some mold bodies not including gripping members 16.

Gripping members 16 may have any suitable configuration. For example, gripping members 16 may be a protrusion, an indentation, a handle, or the like. Gripping members 16 may be large enough to be gripped by a practitioner's hand, a practitioner's fingers, or a tool used by a practitioner. In one example, a protrusion may be large enough to accommodate a thumb and an index finger of the practitioner. In another example, an indentation may be sized to receive the tip of a pair of dental pliers. Gripping members 16 may be the same size, or may be sized differently from each other. Gripping members 16, in some examples, are sufficiently stiff such that the practitioner can put force on mold body 12, remove mold body 12 from tooth 18a, push or pull mold body 12, or the like without gripping members 16 bending or breaking.

In some examples, gripping members 16 may additionally include textured features and/or visual indicators. For example, a textured feature such as one or more ribs on gripping members 16 may help prevent gripping members 16 from slipping out of the hand of the practitioner. In another example, gripping members 16 including visual indicators may designate the proper location of mold body 12 in the mouth of the patient (e.g., which teeth 18 mold body 12 is configured to align with and mate with to form the desired tooth structure of the particular patient), the order in which mold body 12 is used (e.g., in the case in which more than one mold body 12 are used in sequence), or the like.

In some examples, gripping members 16 are proximate to the part of mold body 12 adjacent to the incisal or occlusal surface of tooth 18a when mold body 12 is positioned over tooth 18a (as shown in FIGS. 1A and 1B), and extend in a direction away from tooth 18a when mold body 12 is positioned over tooth 18a. In this way, gripping members 16 may allow a practitioner to handle mold body 12 without having directly to handle registration members 14, mold cavity 24, and/or the portion of mold body 12 configured to align with at least a portion of tooth 18a. Additionally, or alternatively, in some examples, gripping members 16 may extend onto at least a portion of mold body 12 that is configured to align with a surface of tooth 18a, e.g., a facial or lingual surface of tooth 18a, which may increase the rigidity of mold body 12. Increasing the rigidity of mold body 12 may make handling and/or placing of mold body 12 easier than some mold bodies which are more flexible. Additionally, or alternatively, increasing the rigidity of mold body 12 may allow mold body 12 to better retain the desired shape of mold cavity 24 (that reflects the desired tooth structure of the individual patient) during handling of mold body 12, such as, for example, during positioning mold body 12 on teeth 18 or filling of mold cavity 24 with restorative material.

In addition to or instead of the gripping members 16 shown in FIG. 1B, in some examples, gripping members 16 may be positioned elsewhere on mold body 12. For example, gripping members 16 may be positioned proximate the part of mold body 12 adjacent to a facial and/or a lingual surface of mold body 12 when mold body 12 is positioned over tooth 18a. Gripping members 16 may ease the use of tool 10 for the practitioner, and may help prevent inadvertent alteration of mold body 12 and/or mold cavity 24 due to directly handling mold cavity 24 or the portion of mold body 12 configured to align with tooth 18a during positioning mold body 12 over tooth 18a, and/or may increase the rigidity of mold body 12.

Tool 10 may be made of any suitable material. For example, customized tool 10 may be made of a vacuum formed film, plastic, an elastomeric material, restorative material, a 3D printable material, a millable material, or combinations thereof. Some example materials may include PETG film, polyurethane, silicone, and fluoropolymers. In some examples, the 3D printable material may include 3D Systems Accura® 60 resin or Accura® ClearVue resin (Rock Hill, South Carolina). Example millable materials may include poly(methyl methacrylate) (PMMA) or 3M Lava™ Ultimate CAD/CAM Restorative (Saint Paul, Minnesota). In some examples, customized tool 10 may be formed of a material transparent to a curing light (e.g., a blue light), such as, for example, in examples in which the restorative dental material is light curable. In some such examples, curing the restorative dental material without removing customized tool 10, may help the practitioner more easily attain a desired final dental restoration that represents the desired tooth structure of the individual patient without significant additional adjustments after curing the restorative dental material.

Additionally, or alternatively, at least a portion of mold body 12 may be made of restorative dental material. In this way, at least a portion of mold body 12 itself may include restorative material to form at least a portion of the desired tooth structure of tooth 18a. In some examples, the portion of mold body 12 formed from restorative dental material may include fully cured restorative dental material. In other examples, the portion of mold body 12 formed from restorative dental material may be partially cured or not cured. In some such examples, the restorative dental material may be cured (e.g., through the use of a curing light) after placement of mold body 12 on teeth 18. If the restorative dental material that forms the portion of mold body 12 is not fully cured, e.g., partially cured or not cured, the restorative dental material may be modified to fit particular needs prior to positioning mold body 12 over teeth 18, e.g., during manufacture of mold body 12. For example, the viscosity of the restorative dental material may be modified to be suitable for a particular manufacturing process used to create customized tool 10. Regardless of the material mold body 12 is formed from, mold body 12 is preformed, e.g., formed prior to use on the patient, to provide a patient-specific, customized tool 10 for use on an individual patient that includes a predefined mold cavity 24 encompassing the desired tooth structure of the patient.

In some examples, additional restorative dental material may be able to be added to mold cavity 24 prior to finishing the dental restoration and/or the cured dental restoration may be trimmed or adjusted after removing at least a portion of mold body 12 from teeth 18, e.g., the portion of mold body 12 not formed from the restorative dental material, to achieve the desired tooth structure of the particular patient. For example, although mold body 12 is customized to form the desired tooth structure of the individual patient, minor adjustments may help remove any minor imperfections that may arise during formation of the dental restoration.

In some examples, mold body 12 at least partially formed by restorative dental material may include two or more different materials. For example, in some cases, at least a portion of mold body 12 may be formed from restorative dental material, and another portion of mold body 12 may be formed from a different material, such as a 3D printable material. In some such cases, the portion of mold body 12 formed from restorative dental material may be configured to be left on tooth 18a to be restored to form the desired tooth structure of the individual patient, and the portion of mold body 12 formed from a different material may be configured to be removed from tooth 18a to be restored.

In some examples, the portion of mold body 12 formed from the restorative dental material may not include a release film or coating, and the part of mold body 12 formed from a different material may include the release film or coating so that the part of mold body 12 formed from the restorative dental material may remain on tooth 18a to form the desired tooth structure of the particular patient, and the portion of mold body 12 formed from the different material may be more easily removed from tooth 18a. Additionally, or alternatively, one or more portions of mold body 12 may be configured to break away from one or more other portions of mold body 12. For example, one or more portions of mold body 12 formed from a material other than restorative dental material may break away from one or more portions of mold body 12 that are formed from restorative dental material so that at least the portion of mold body 12 formed from restorative dental material remains of tooth 18a to form the desired dental restoration. In some examples, breaking away individual portions of mold body 12 may help prevent inadvertent removal of the portion of mold body 12 from tooth 18*a* made from restorative material that is configured to form the dental restoration.

In some examples, the portion of mold body 12 formed from restorative dental material configured to remain on tooth 18*a* to form the desired dental restoration may be delineated by visible indicators on mold body 12, such as color or physical markers, to indicate the portion of mold body 12 configured to remain on tooth 18*a* to form the dental restoration and/or the portion of mold body 12 configured to be removed from tooth 18*a*. A portion of mold body 12 formed of restorative material may result in ease the use of customized tool 10 in some examples.

While customized tool 10 is described with respect to a single mold cavity 24 for restoring a single tooth 18*a*, customized tool 10 may additionally be configured to define two or more mold cavities on a single tooth, a single mold cavity on two or more teeth, two or more mold cavities on two or more teeth, or the like. In an example, mold body 12 may be configured to align with a second portion of a surface of tooth 18*a* to be restored to define a second mold cavity. In some examples, the second mold cavity may encompass at least a second portion of desired tooth structure of tooth 18*a* to be restored for the individual patient, such as, for example, a second transition from a second supragingival surface of tooth 18*a* to a second subgingival surface tooth 18. In any case, customized tool 10 defines predefined, patient-specific mold cavities that encompass the desired tooth structure of an individual patient.

Figure 2A:
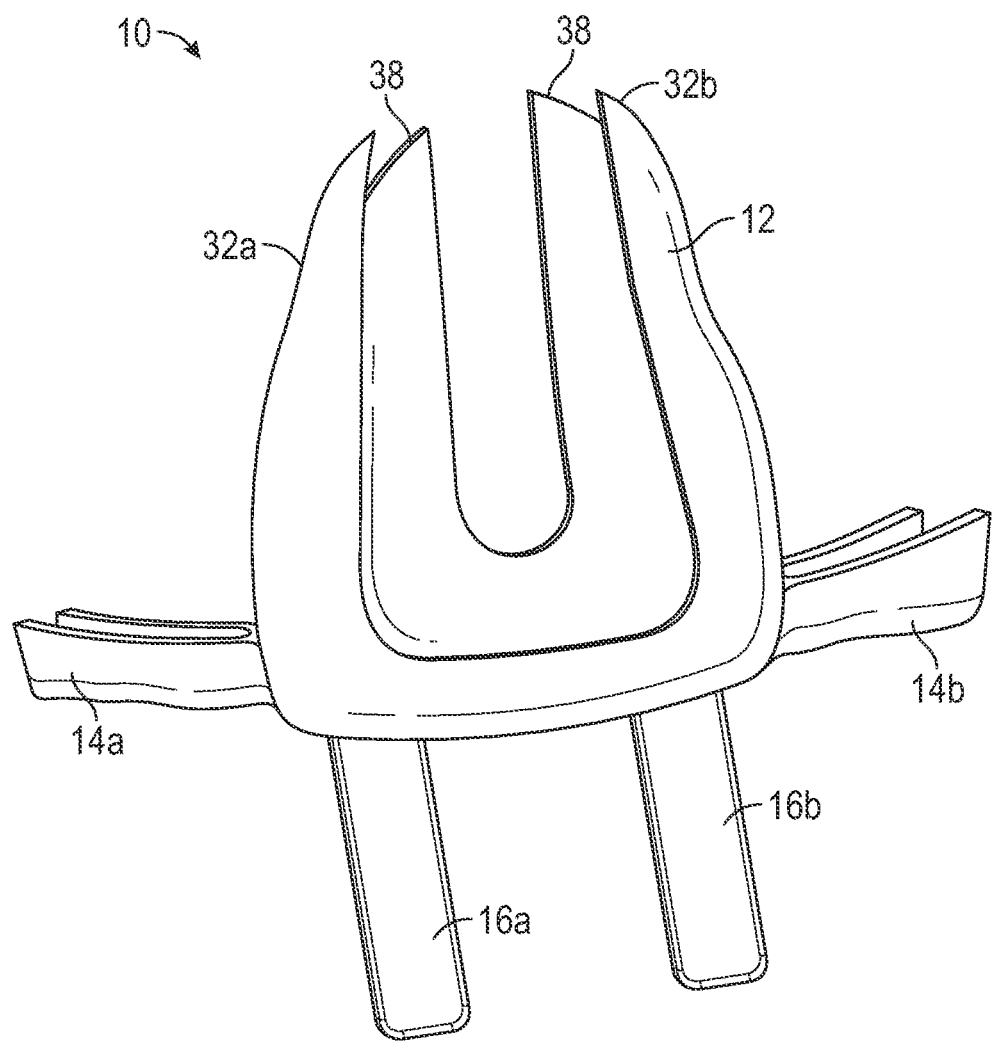
FIGS. 2A-2C are perspective front, back, and top views, respectively, of the example customized tool of FIGS. 1A and 1B for forming a dental restoration.
Figure 2B:
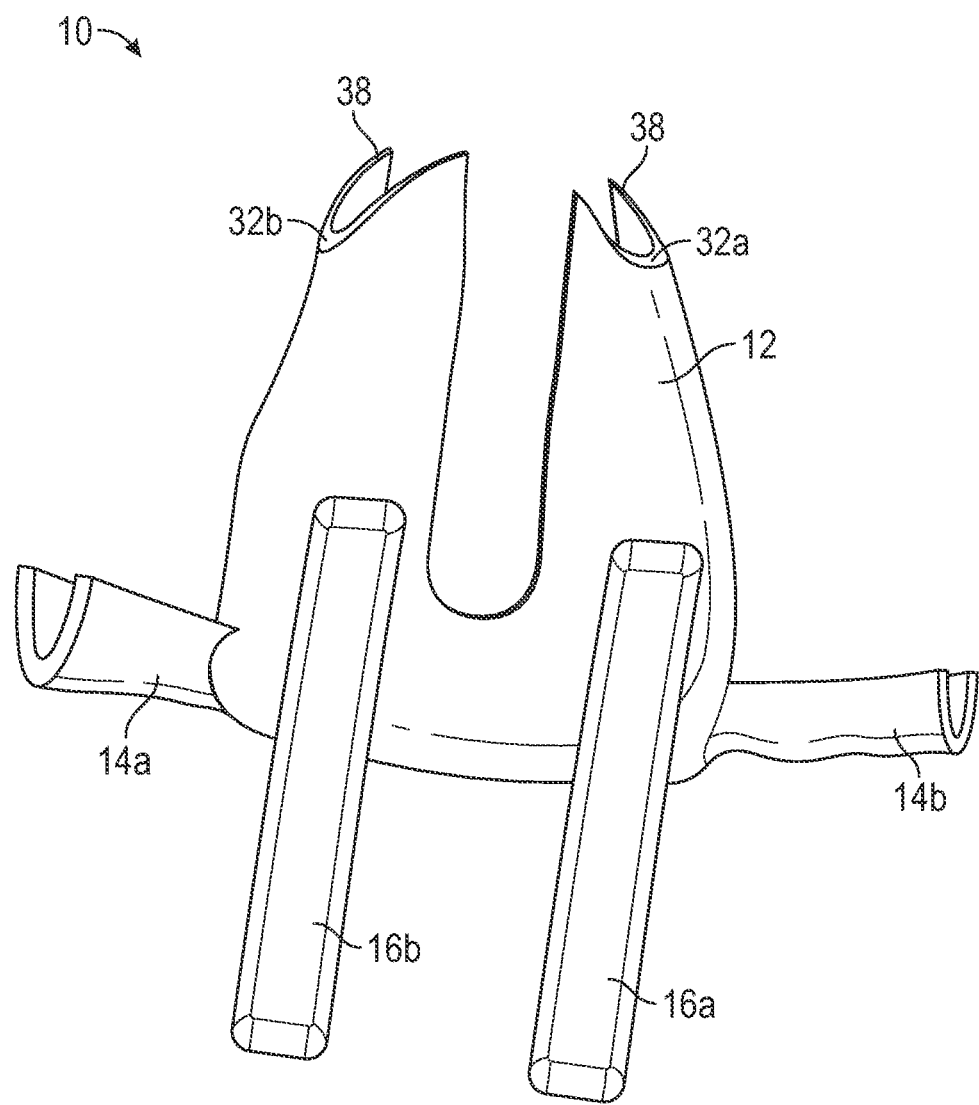
Figure 2C:
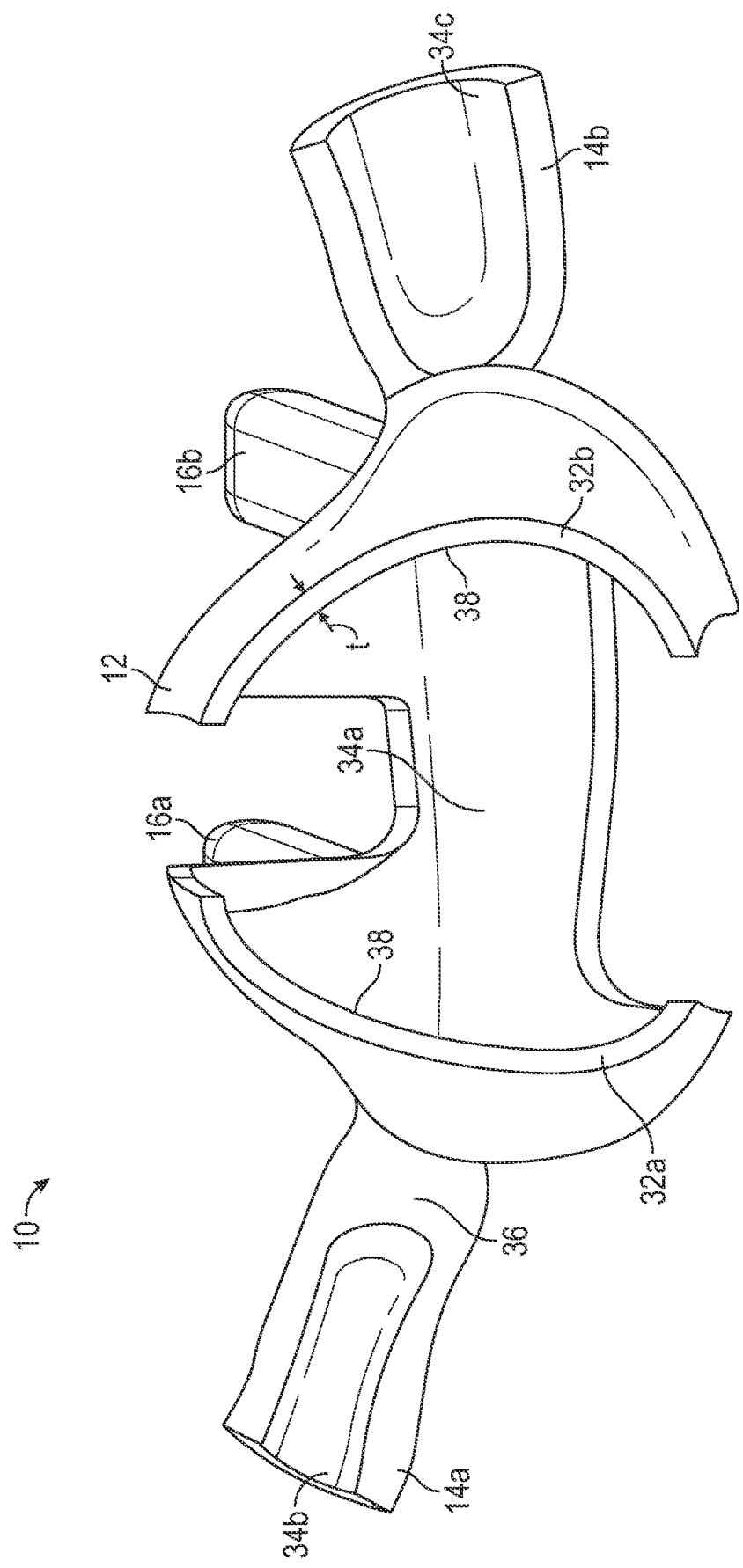

FIGS. 2A-2C are perspective front, back, and top views, respectively, of the example tool 10 of FIGS. 1A and 1B for forming a dental restoration. As shown in FIGS. 2A-2C, mold body 12 defines subgingival portions 32*a*, 32*b* (collectively, "subgingival portions 32"). Subgingival portions 32 may be the portion of mold body 12 configured to contact at least a portion of a subgingival surface 28 of tooth 18*a* to be restored to concentrate sealing pressure at at least a portion of a perimeter 38 of mold cavity 24. For example, subgingival portions 32 may contact a root or neck of tooth 18*a* to be restored to concentrate sealing pressure at perimeter 38 of mold cavity 24. In this way, transmission of body fluids and/or restorative dental material across the perimeter may be reduced and the finished dental restoration may substantially fully contact subgingival surface 28 to form a hermetic or a substantially hermetic seal with the root or neck, therefore reducing or even eliminating any spaces between the finished dental restoration and subgingival surface 28. This may help prevent food particles and/or plaque from becoming entrapped between the dental restoration and the root or neck of tooth 18*a*. In turn, patient discomfort, premature failure of the dental restoration, tooth decay, such as secondary caries, and/or plaque buildup at or around the dental restoration may be prevented or decreased.

In order to contact subgingival surface 28 of tooth 18*a*, subgingival portions 32 may be configured to displace a portion of gingiva 30 of the patient or extend between a portion of gingiva 30 of the patient and subgingival surface 28 of tooth 18*a* to be restored without substantially displacing gingiva 30 (e.g., without displacing or without applying force intended to displace gingiva 30). In examples in which subgingival portions 32 are configured to displace a portion of gingiva 30, subgingival portions 32 may be thicker (e.g., as measured by line "t" in FIG. 2C) and/or made of a stiffer material in comparison to subgingival portions 32 configured to extend between a portion of gingiva 30 of the patient and subgingival surface 28 of tooth 18*a* without substantially displacing gingiva 30. In either case, subgingival portions 32 may be shaped and/or angled in a manner to contact subgingival surface 28 of tooth 18*a* to be restored and provide concentrated sealing pressure at subgingival surface 28 of tooth 18*a* when mold body 12 is positioned over tooth 18*a*.

In some examples, mold body 12 may include a wedging member 36 configured to displace a portion of gingiva 30 of the patient proximate to tooth 18*a* and/or displace tooth 18*b*, 18*c* adjacent to tooth 18*a* to be restored when mold body 12 is positioned over tooth 18*a* to be restored to define mold cavity 24. In the examples shown in FIG. 2C, wedging member 36 is configured to displace tooth 18*b*, 18*c* adjacent to tooth 18*a* to be restored when mold body 12 is positioned over tooth 18*a* to be restored to define mold cavity 24, e.g., separate tooth 18*a* and tooth 18*b* or 18*c*. For example, the thicker portion of registration member 14*a* that forms wedging member 36 is configured to separate tooth 18*b* that contacts registration member 14*a* from tooth 18*a* to be restored. In some such examples, wedging member 36 may separate adjacent teeth 18 in order to better access the interproximal surface of tooth 18*a* to be restored or to compensate for the size of mold body 12 between teeth 18, to make more space to position mold body 12 over tooth 18*a*, or the like.

For example, if mold cavity 24 defines an interproximal surface of tooth 18*a* to be restored, then wedging member 36 may separate tooth 18*a* from an adjacent tooth 18*b* or 18*c* at least a distance of "t" so that when mold body 12 is removed from tooth 18*a*, little or no space remains between the restored interproximal surface of tooth 18*a* and the interproximal surface of tooth 18*b* or 18*c*. In some cases, having little or no space remain between the restored interproximal surface of tooth 18*a* and the interproximal surface of tooth 18*b* or 18*c*, may help prevent the appearance of black triangles between the teeth, be more aesthetically pleasing to the patient, and/or may result in fewer return visits to the practitioner's office for adjustments, e.g., to adjust restored interproximal surface of tooth 18*a* to contact the interproximal surface of tooth 18*b* or 18*c*.

In other examples, wedging member 36 may function similar to or the same as the example in which subgingival portions 32 are configured to displace a portion of gingiva 30 of the patient proximate to tooth 18*a* to be restored. For example, wedging member 36 may be configured to push gingival margin 20 in the direction of subgingival surface 28 and/or in a direction towards an adjacent tooth 18*b* or 18*b*, which may expose a portion of subgingival surface 28 in some examples. This may allow a practitioner to more easily see perimeter 38 of mold cavity 24 to aid in correct positioning of mold body 12 over tooth 18*a*, and may also allow a practitioner to more easily see and remove any flash formed during finishing of the restoration. In some examples, mold body 12 may include both subgingival portions 32 and wedging member 36 configured to displace a portion of gingiva 30 of the patient. In other examples, one of subgingival portions 32 or wedging member 36 may be configured to displace a portion of gingiva 30 of the patient, or mold body 12 may not include wedging member 36.

As seen in FIG. 2C, mold body 12 includes registration surfaces 34*a*, 34*b*, and 34*c* (collectively, "registration surfaces 34") defined by registration members 14. In some examples, registration surfaces 34 may be configured to align with at least a portion of an occlusal or an incisal surface 22 of tooth 18*a*, 18*b*, and/or 18*c*. For example, registration surfaces 34*b* and 34*c* may be an inner surface of registration members 14*a* and 14*b*, respectively, and may be configured to align with and mate with an occlusal or an incisal surface of the respective teeth in which registration members 14 are intended to contact. For example, each registration surface 34 may be customized to a specific tooth of a patient such that registration surface 34 substantially matches the profile of the occlusal or incisal surface 22 of the respective tooth. Additionally, or alternatively, registration surfaces 34 may be configured to contact a structure other than an occlusal or an incisal surface 22 of tooth 18*a*, 18*b*, and/or 18*c*. For example, registration surfaces 34 may be configured to align with and mate with a lingual matrix or a transpalatal bar in the mouth of the patient.

In some examples, registration surfaces 34*b* and 34*c* may be configured to contact and align with occlusal or incisal surfaces 22*a*, 22*b* of one or more teeth 18*b*, 18*c* adjacent to tooth 18*a* to be restored when mold body 12 is properly positioned over tooth 18*a* to be restored to define mold cavity 24. In one example, registration surface 34*b* may match the profile of occlusal or incisal surface 22*a* of tooth 18*b*, and registration surface 34*c* may match the profile of occlusal or incisal surface 22*b* of tooth 18*c*. Additionally, or alternatively, mold body 12 may include registration surface 34*a* configured to align with an occlusal or an incisal surface of tooth 18*a* to be restored. In another example, one or more registration surfaces 34 may be configured to contact a structure other than an occlusal or an incisal surface 22 of tooth 18*a*, 18*b*, and/or 18*c*. In some such examples, registration surfaces 34 may provide a customized fit with the structure, e.g., lingual matrix or a transpalatal bar in the mouth of the patient, it is intended to contact. In this way, registration surfaces 34 provide a customized fit with one or more occlusal and/or incisal surfaces 22 of one or more teeth 18 and/or another structure, which may help a practitioner align and position mold body 12 over the proper teeth 18 and/or in the proper position over respective teeth 18. For example, the customized fit provided by registration surfaces 34 may result in mold body 12 not fitting and/or sitting in the proper location on teeth 18 that mold body 12 is not intended to be positioned over. Therefore, mold body 12 including registration members 14 and/or registration surfaces 34 may increase the ease of use of tool 10 and help prevent mold body 12 from being used for a dental restoration other than the predefined, patient-specific dental restoration that mold body 12 is intended for.

Figure 3:
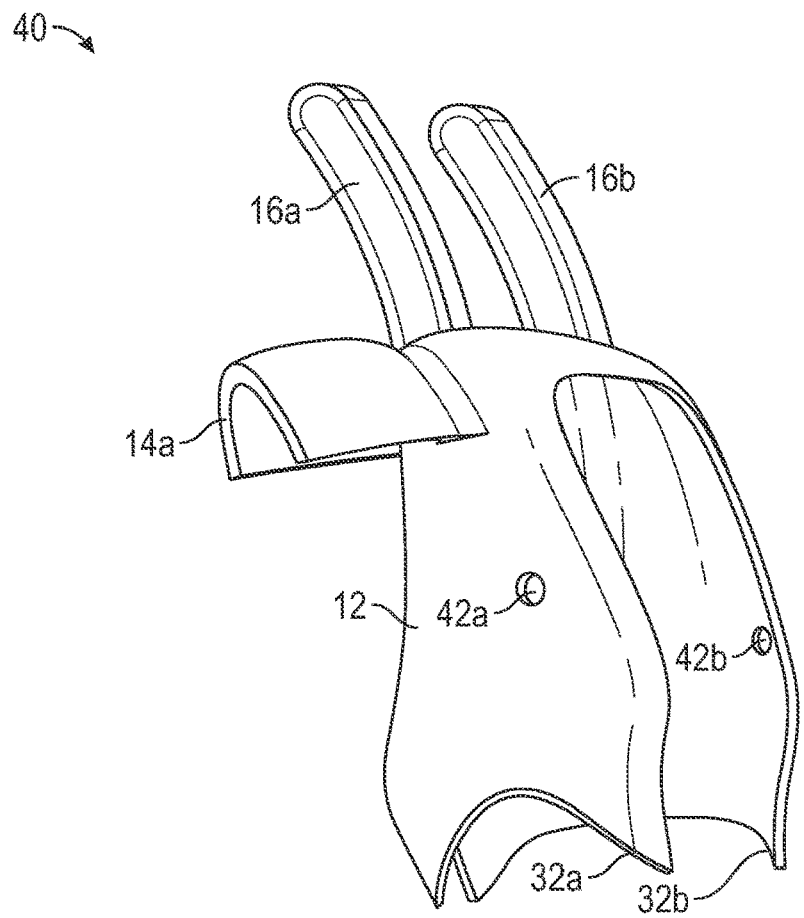
FIG. 3 is an example customized tool for forming a dental restoration, the tool defining injection ports.

FIG. 3 is an example customized tool 40 for forming a dental restoration, the customized tool defining injection ports 42*a*, 42*b* (collectively, "injection ports 42"). Customized tool 40 may be similar to customized tool 10 of FIGS. 1A-2C. Injection ports 42 are configured to allow placement of restorative dental material in mold cavity 24 formed by mold body 12 and/or tooth 18*a* to be restored after mold body 12 is positioned over the tooth structure of the patient. For example, injection ports 42 may be sized in order to fit a tip of a commercially available restorative material introduction device.

Tips of some commercially available restorative material introduction devices have an inner diameter between about 0.6 mm and about 2.3 mm and an outer diameter between about 0.90 mm and about 2.7 mm. For example, a 3M Filtek Supreme Universal capsule, may have an inner diameter of about 2.03 mm and an outer diameter of about 2.41 mm, the 3M Filtek Supreme Flowable syringe tip may have an inner diameter of about 0.60 mm and an outer diameter of about 0.90 mm, and the 3M Filtek Bulk Fill syringe tip may have an inner diameter of about 0.70 mm and an outer diameter of about 1.10 mm. The 3M Filtek products are commercially available by 3M ESPE Dental Products of Saint Paul, Minnesota. As other examples, commercially available devices used to deliver restorative dental material may have an inner diameter of about 1.85 mm and an outer diameter of about 2.30 mm, an inner diameter of about 2.20 mm and an outer diameter of about 2.70 mm, an inner diameter of about 2.10 mm and an outer diameter of about 2.60 mm, an inner diameter of about 1.10 mm and an outer diameter of about 1.60 mm, an inner diameter of about 1.90 mm and an outer diameter of about 2.50 mm, or an inner diameter of about 2.30 mm and an outer diameter of about 2.60 mm.

In some examples, mold body 12 includes more than one injection port 42. In other examples, mold body 12 may include one injection port 42*a* or 42*b*. In some examples, mold body 12 including one or more injection ports 42 may allow easier placement of the restorative material into mold cavity 24, such as when mold body 12 is positioned over tooth 18*a* to be restored prior to introducing the restorative material into mold cavity 24.

Injection ports 42 may be configured (e.g., sized and shaped) and located in any location on mold body 12 to facilitate introduction (e.g., placement and/or flow) of the restorative material into mold cavity 24. For example, injection ports 42 may located closer to subgingival portions 32 in examples in which the desired tooth structure of tooth 18*a* to be restored includes a transition from supragingival surface 26 of tooth 18*a* to subgingival surface 28 of tooth 18*a*. In other examples, injection ports 42 may located further from subgingival portions 32, e.g., closer to registration members 14, in examples in which the desired tooth structure of tooth 18*a* to be restored includes a portion of an interproximal surface of tooth 18*a*. For example, mold body 12 may define an injection port 42 that is aligned with an incisal edge of tooth 18*a* when mold body 12 is positioned over tooth 18*a*.

In some examples, injection ports 42 may be additionally or alternatively configured as a vent to allow excess restorative material to flow out of mold cavity 24, which may be removed prior to curing (e.g., with a scalar instrument), providing for easier removal of flash, or may be configured to allow air to flow out of mold cavity 24.

Although two injection ports 42 are shown in FIG. 3, in other examples, mold body 12 may define any suitable number of injection ports, such as one, three, four or more, and any suitable number of vent ports, such as one, two, three or more.

In the example shown in FIGS. 1A-3, mold body 12 is configured to fit over a majority of a supragingival surface 26 of tooth 18*a* to be restored. In other examples, mold body 12 may have another configuration, which may be selected based on the desired tooth structure being formed with the aid of mold body 12.

Figure 4A:
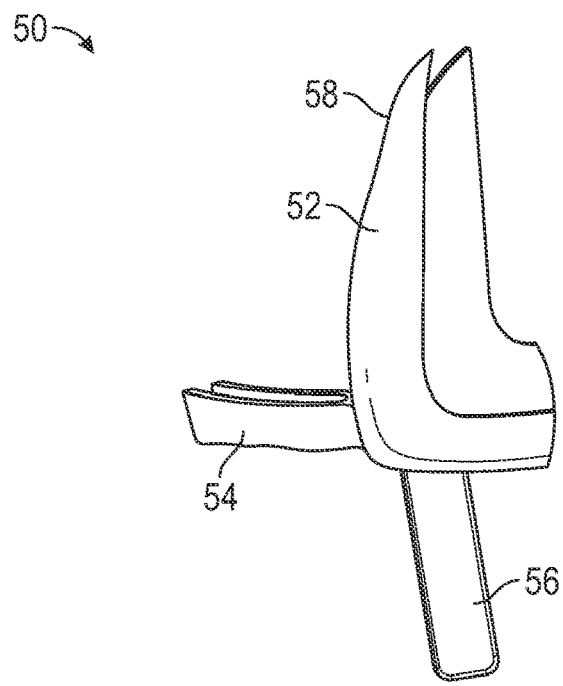
FIGS. 4A-4C are perspective front, back, and top views, respectively, of another example customized tool for forming a dental restoration.
Figure 4B:
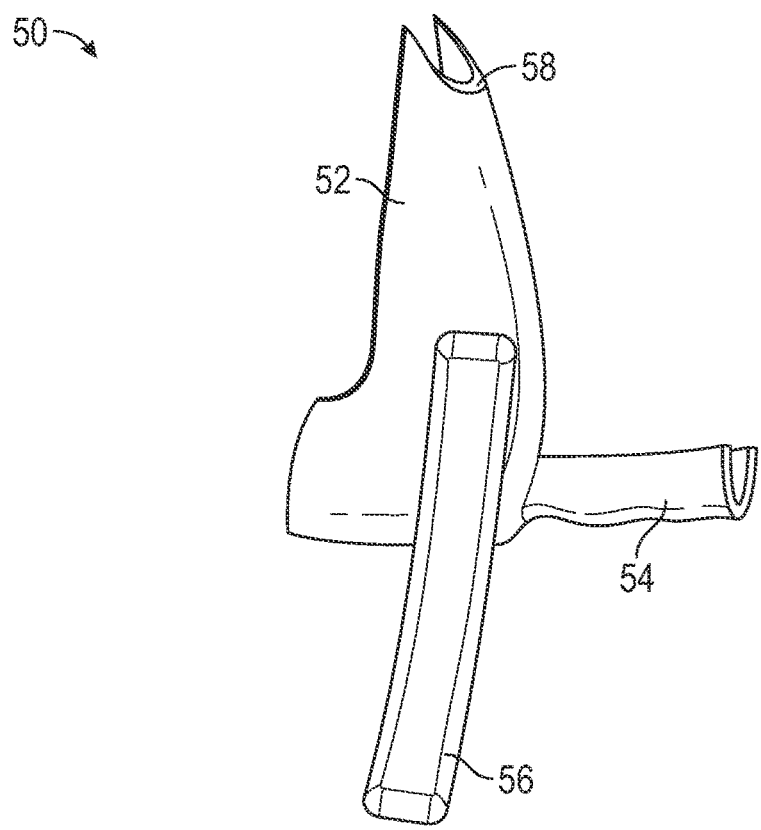
Figure 4C:
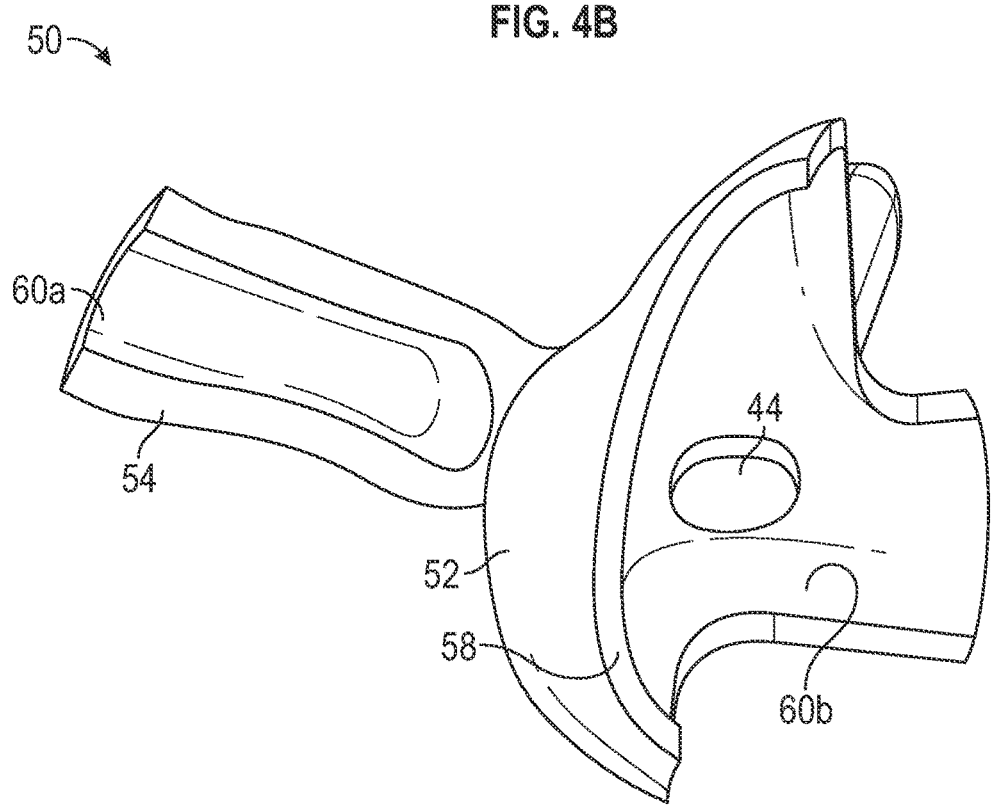

FIGS. 4A-4C are perspective front, back, and top views, respectively, of another example customized tool 50 for forming a dental restoration. Customized tool 50 may be similar to customized tool 10 of FIGS. 1A-2C, however, customized tool 50 may be designed to extend adjacent to a single interproximal surface of a tooth to be restored rather than extending adjacent to two interproximal surfaces of the tooth to be restored as shown in FIGS. 1A-3. Otherwise, however, mold body 52, registration member 54, gripping member 56, registration surfaces 60*a*, 60*b*, and subgingival surface 58 of tool 50 may be the same or substantially the same as mold body 12, registration member 14, gripping member 16, registration surfaces 34, and subgingival surfaces 32, respectively, of customized tool 10.

In some examples, customized tool 50 configured to extend adjacent to a single interproximal surface of the tooth to be restored may allow customized tool 50 to be used for multiple restorations, to be used adjacent to additional dental restoration tools, and/or be easier to position over the tooth to be restored.

In examples in which customized tool 50 may be used to form two or more dental restorations, the two or more dental restorations may be on two adjacent teeth. For example, the two or more dental restorations may be adjacent transitions from a subgingival surface to a supragingival surface of each respective tooth of the two adjacent teeth. In some such examples, customized tool 50 may not include registration member 54. In this way, two mold bodies 52 may be able to be placed on each respective tooth, e.g., so that a portion of each mold body 52 fits adjacent to each other in the space between the adjacent teeth. Additionally, or alternatively, registration member 54 may be configured to align with and mate with a tooth of the patient that is not being restored, or with a structure other than the teeth of the patient, such as, for example, a lingual matrix or a transpalatal bar in the mouth of the patient.

In some examples, in addition to or instead of injection ports 42 shown in FIG. 3, mold body 52 may include an opening 44 proximate to the incisal or occlusal surface of the tooth to be restored (when mold body 52 is positioned over the respective tooth). Opening 44 may facilitate introduction of the restorative material into a mold cavity defined by mold body 52 when positioned over the tooth to be restored. In some examples, opening 44 may be larger than each of the injection ports 42a, 42b. In some such examples, back pressure on a tip of a dental material introduction device introducing restorative dental material into the mold cavity may be reduced or even eliminated during placement of restorative dental material. The reduced or prevented back pressure may help prevent restorative material from flowing back in the direction of the restorative material introduction device. Additionally, or alternatively, opening 44 that is larger than injection ports 42a, 42b may allow the practitioner to more easily see at least a portion of the tooth to be restored, more easily clean and/or dry the tooth to be restored, and/or facilitate easier placement or adjustment of an adhesive material or restorative dental material on the tooth to be restored.

Figure 5A:
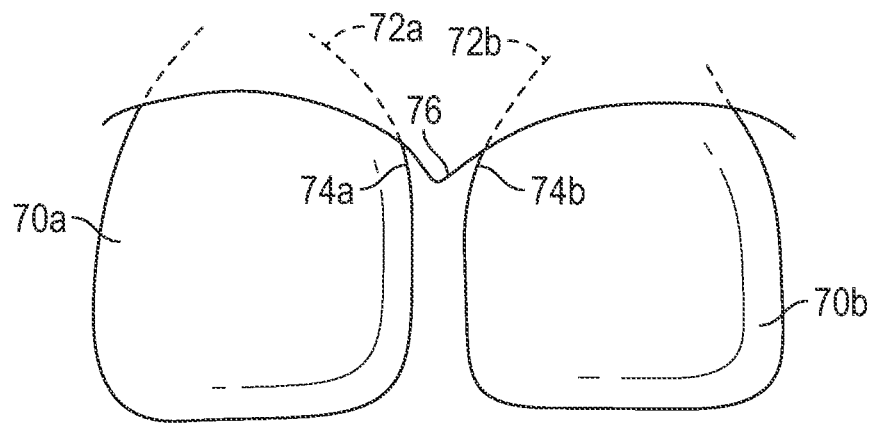
FIGS. 5A-5H illustrate an example technique for forming a dental restoration using the customized tool of FIGS. 4A-4C.

FIGS. 5A-5H illustrate an example technique for forming a dental restoration using customized tool 50 of FIGS. 4A-4C. Specifically, FIGS. 5A-5H illustrate a dental restoration including forming desired emergence profiles on adjacent teeth 70a, 70b and closing a diastema between such teeth by forming desired interproximal surfaces of teeth 70a, 70b using customized mold bodies 52a, 52b configured to provide predefined, patient specific fits on teeth 70a, 70b, respectively. FIG. 5A illustrates two adjacent teeth 70a, 70b to be restored. Each tooth 70a, 70b has a subgingival surface 72a, 72b and a supragingival surface 74a, 74b, respectively. Gingival margin 76 demarcates subgingival surfaces 72a, 72b and respective supragingival surfaces 74a, 74b of each tooth 70a, 70b.

Figure 5B:
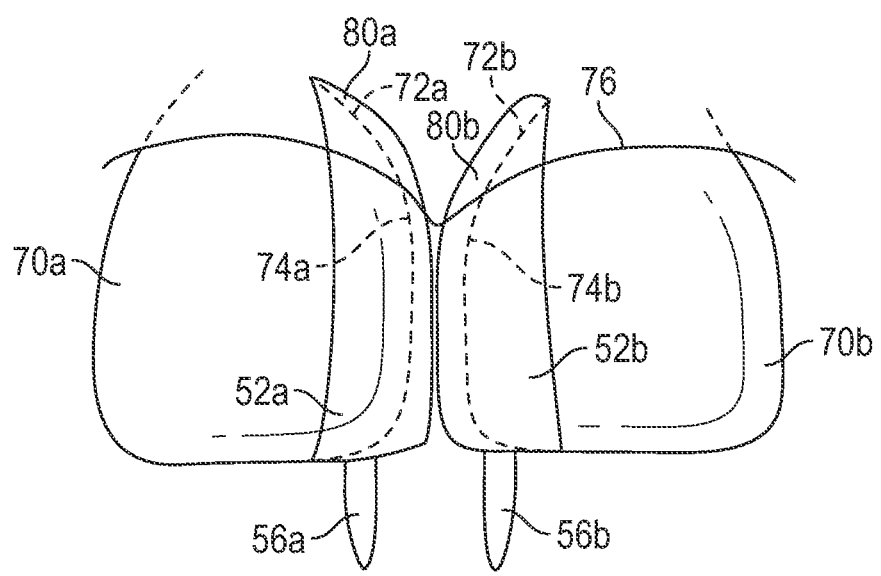

As seen in FIG. 5B, mold bodies 52a, 52b may be positioned over respective teeth 70a, 70b in order to define respective mold cavities 80a and 80b encompassing the desired tooth structure of the individual patient. Mold bodies 52a, 52b are examples of mold body 52 of FIGS. 4A-4C. Mold cavities 80a, 80b may each be used to define a desired tooth structure that transitions from the respective supragingival surface 74a, 74b to the respective subgingival surface 72a, 72b of the respective tooth 70a, 70b.

Figure 5C:
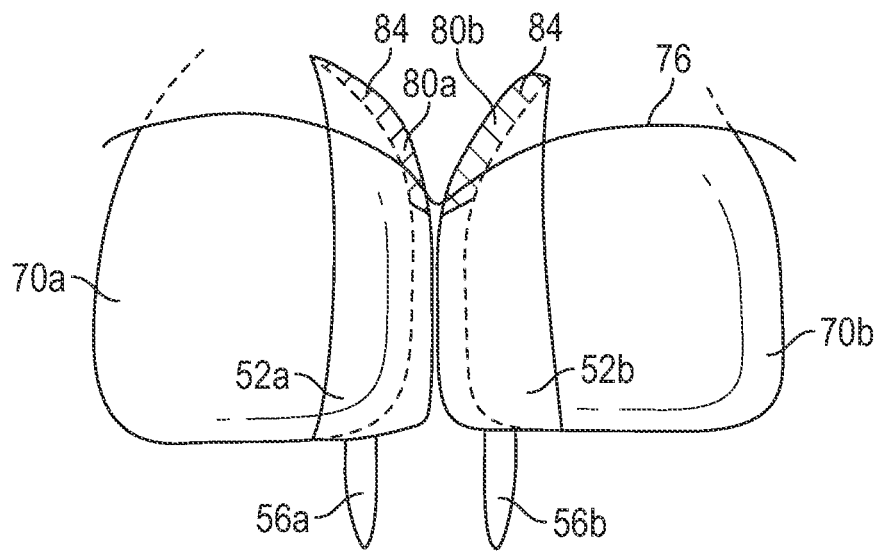

FIG. 5C illustrates restorative dental material 84 that has been introduced into mold cavities 80a and 80b. In some examples, a tip of a restorative material introduction device may be used to introduce restorative material 84 into mold cavities 80a, 80b, e.g., though an injection port (e.g., port 42A or 42B shown in FIG. 3), an incisal/occlusal opening (e.g., opening 44 shown in FIG. 4C), or the like. In addition to, or instead of, using a restorative material introduction device, the practitioner may introduce restorative material 84 into mold cavities 80a, 80b by fully or partially prefilling mold cavities 80a, 80b with restorative material 84 before placement of mold bodies 52a, 52b over teeth 70a, 70b and/or by placing restorative material 84 on teeth 70a, 70b and then subsequently positioning mold bodies 52a, 52b over teeth 70a, 70b and restorative material 84. Mold bodies 52a, 52b, in some examples, may be formed from restorative material. In some such examples, restorative dental material 84 may not have to be introduced into mold cavities 80a, 80b, but may be built into mold bodies 52a, 52b.

Figure 5D:
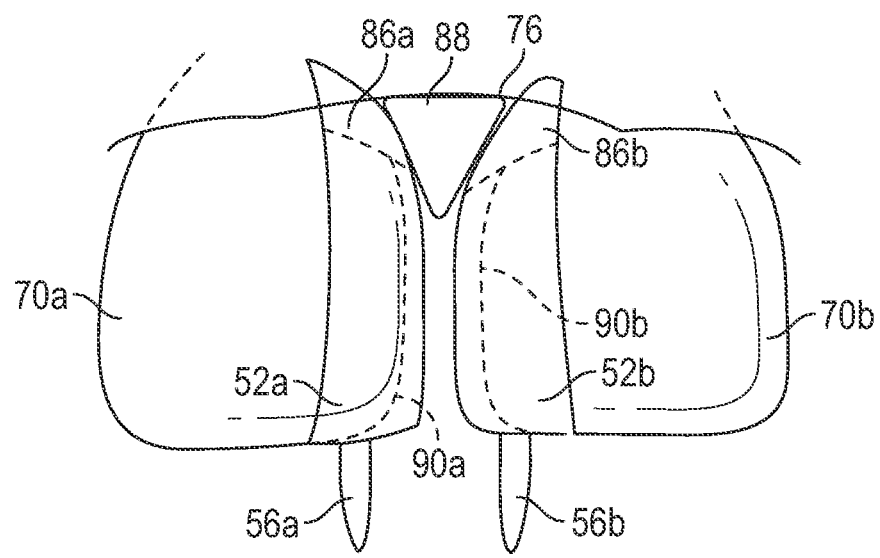
Figure 5E:
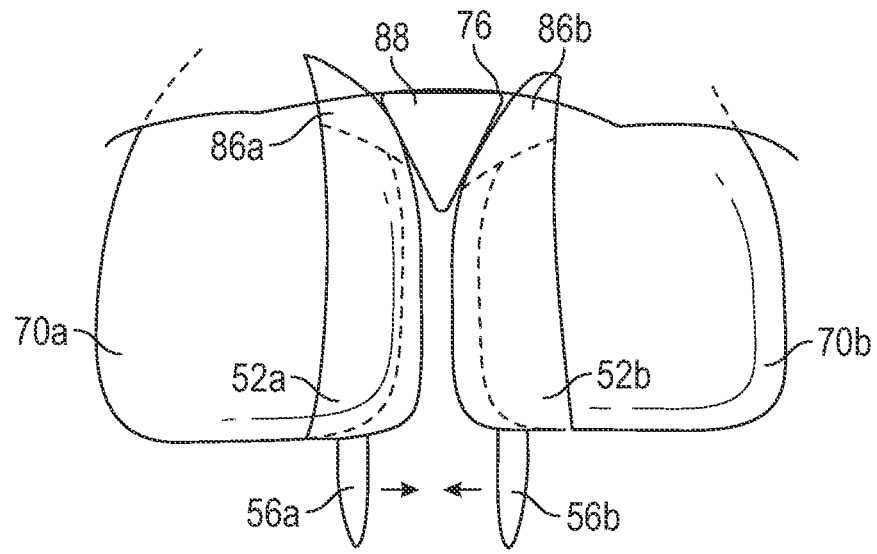

After being introduced into mold cavities 80a, 80b, restorative material 84 may be cured to form dental restorations 86a, 86b including the desired transition from supragingival surface 74a, 74b to subgingival surface 72a, 72b of each respective tooth 70a, 70b (FIG. 5D). For example, in examples in which restorative material 84 is light curable, the practitioner may expose restorative material 84 to a curing light (e.g., a blue light) through mold bodies 52a, 52b, which may be formed of a material transparent to the curing light. In other examples, mold bodies 52a, 52b may be removed from the respective tooth 70a, 70b, leaving a restored structure defined by restorative material 84, and then the practitioner may cure restorative material 84. In yet another example, at least a portion of mold bodies 52a, 52b may be made of restorative material 84, and the practitioner may cure the portion of mold bodies 52a, 52b made of restorative material 84 (if the restorative dental material 84 is not already fully cured). In some examples, additional tools, whether physically separate from mold bodies 52a, 52b or incorporated as part of one or both of mold bodies 52a, 52b may be used to facilitate the formation of a dental restoration. For example, in the example shown in FIG. 5D, before or after forming the desired emergence profiles of dental restorations 86a, 86b, wedging tool 88 is inserted between teeth 70a, 70b to displace gingival margin 76 and separate teeth 70a, 70b and dental restorations 86a, 86b. Wedging tool 88 may facilitate forming additional dental restorations on teeth 70a, 70b, such as, for example, defining interproximal surfaces 90a, 90b of teeth 70a, 70b. In other examples, wedging tool 88 may not be used, or the dental restoration may be completed after curing of restorative material 84 in mold cavities 80a, 80b.

Figure 5F:
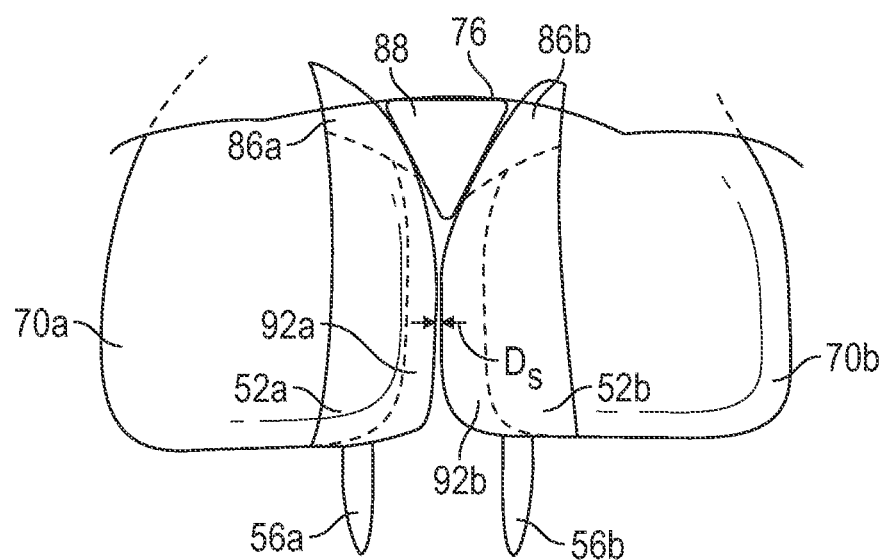

In examples in which interproximal surfaces 90a, 90b are to be restored using mold bodies 52a, 52b, wedging tool 88 may be configured to separate teeth 70a, 70b and/or dental restorations 86a, 86b to compensate for the size of mold bodies 52a, 52b in the interproximal space between teeth 70a, 70b. For example, a practitioner may pull gripping members 56a, 56b in the direction of the arrows in FIG. 5E to define mold cavities 92a, 92b to form the desired, predefined, patient-specific interproximal dental restorations of teeth 70a, 70b (FIG. 5F). In some such examples, wedging member 88 may be configured to separate teeth 70a, 70b and/or dental restorations 86a, 86b a distance $D_s$ (FIG. 5F) to compensate for the thickness of mold bodies 52a, 52b in the interproximal space of teeth 70a, 70b. In some examples, an additional or an alternative mold body other than mold bodies 52a, 52b may be used to define mold cavities 92a, 92b.

In examples in which at least a portion of mold bodies 52a, 52b are formed by restorative dental material, and that portion is at least part of mold bodies 52a, 52b configured to align with interproximal surfaces 90a, 90b, then wedging member 88 may not be configured to separate teeth 70a, 70b and/or dental restorations 86a, 86b, e.g., the distance "$D_s$" (FIG. 5F), to compensate for the thickness of mold bodies 52a, 52b in the interproximal space of teeth 70a, 70b. For example, the thickness of bodies 52a, 52b may be formed by restorative dental material, and therefore may be part of the formed desired tooth structure of the particular patient.

Figure 5G:
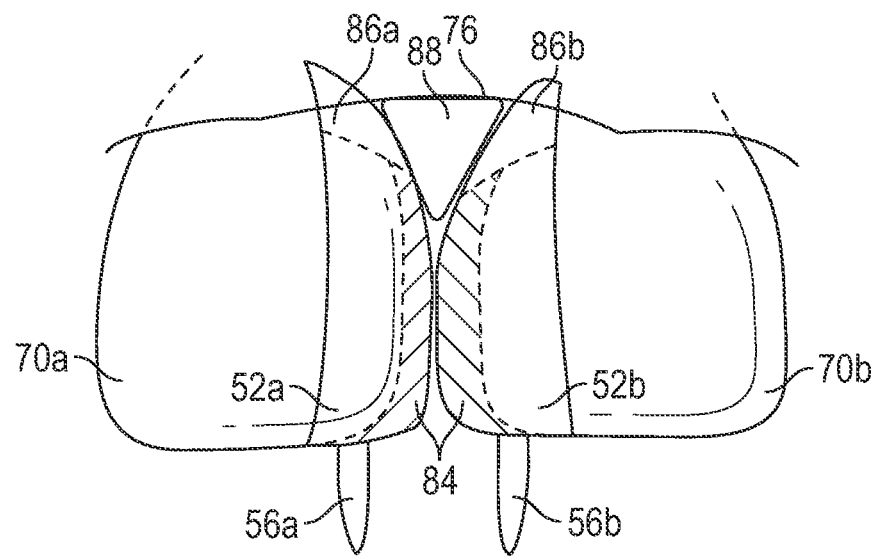
Figure 5H:
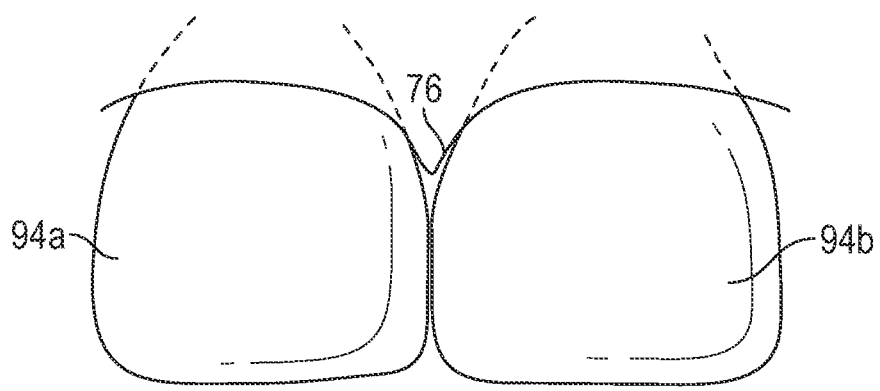

Restorative dental material 84 may be introduced into mold cavities 92a, 92b (FIG. 5G). In some examples, a tip of a restorative material introduction device may be used to introduce restorative material 84 into mold cavities 92a, 92b, e.g., though an injection port, an incisal/occlusal opening, or the like. Restorative material 84 may then be cured (e.g., if not already fully cured) to form the dental restorations the interproximal restorations of teeth 70a, 70b. As shown in FIG. 5H, mold bodies 52a, 52b and wedging tool 88 may be removed to allow gingival margin 76 to return to a resting state (the state in which no external forces are applied to the gingiva by mold bodies 52a, 52b). In some examples, restored teeth 94a, 94b includes dental restorations defining the transition from supragingival surface 74a, 74b to subgingival surface 72a, 72b and interproximal surfaces 90a, 90b of each respective tooth 70a, 70b.

Figure 6:
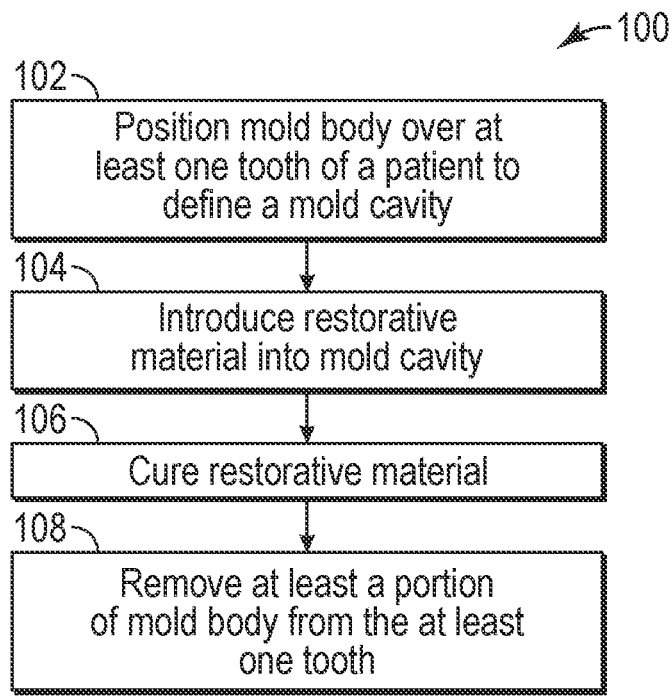
FIG. 6 is a flow diagram illustrating an example technique for using any of the customized tools of FIG. 1A-4C to form a dental restoration.

FIG. 6 is a flow diagram illustrating an example technique 100 or using any of the tools of FIG. 1A-4C to form a dental restoration. The technique 100 shown in FIG. 6 may be completed in any order, include one or more additional steps, and/or may not include one or more steps as illustrated in FIG. 6. FIG. 6 is described with respect to tool 10 of FIG. 1 and tool 40 of FIG. 3 for ease of description only. In other examples, other tools may be used with the technique 100 shown in FIG. 6.

In the example technique 100 of FIG. 6, a practitioner positions mold body 12 over at least one tooth 18a to define mold cavity 24 (102). In some examples, mold body 12 is configured to provide a customized, patient-specific fit with tooth 18a. Mold body 18a may also be configured to align with a portion of a surface of tooth 18a. In some examples, mold cavity 24 defines a desired transition from supragingival surface 26 of tooth 18a to subgingival surface 28 of tooth 18a.

The practitioner introduces restorative material into mold cavity 24 (104). In some examples, a tip of a restorative material introduction device may be used to introduce restorative material into mold cavity 24, such as, for example, though an injection port 42 (FIG. 3), an incisal/occlusal opening, e.g., opening 44 (FIG. 4C), or the like. In addition to or instead of using a restorative material introduction device, the practitioner may introduce restorative material into mold cavity 24 by fully or partially prefilling mold cavity 24 with restorative material before positioning mold body 12 over tooth 18a to be restored and/or by placing restorative material on tooth 18a to be restored and then subsequently positioning mold body 12 over tooth 18a to be restored and the restorative material. In some such examples, the restorative material may not be introduced into mold cavity 24, but rather mold body 12 itself may be formed at least partially from (e.g., entirely from or only partially from) restorative material to form at least a portion of the dental restoration of tooth 18a.

After filling mold cavity 24 with restorative material into mold cavity 24, the practitioner may cure the restorative material (106). In some examples, the practitioner may cure the restorative material while mold body 12 is positioned over tooth 18a to be restored. For example, in examples in which the restorative material is light curable, the practitioner may expose the restorative material to a curing light (e.g., a blue light) through mold body 18a, which may be formed of a material transparent to the curing light. In other examples, mold body 12 may be removed from tooth 18a to be restored, leaving a restored structure defined by the restorative material, and then the restorative material can be cured. In examples in which at least a portion of mold body 12 is made of restorative material, curing the restorative material (106) may include curing the portion of mold body 12 made of restorative material, in the case in which the restorative material is not already fully cured.

The practitioner may remove at least a portion of mold body 12 from tooth 18a (108). As described above, mold body 12 may be removed (108) prior to curing the restorative material (106). In other examples, the restorative material is cured while mold body 12 is positioned over tooth 18a to be restored, and mold body 18a may be removed from tooth 18a after curing the restorative material (108). As described above, in some examples, mold body 12 may be formed of restorative material. In this way, a portion of mold body 12, e.g., a portion not made of restorative material, may be removed from tooth 18a (108) and the restorative material previously forming mold body 12 may remain on tooth 18a to form the cured, final dental restoration forming the desired, patient-specific tooth structure of the individual patient.

Although not shown in FIG. 6, in some examples, the technique 100 of FIG. 6 may include, in some examples, inserting at least a portion of mold body 12 between a portion of gingiva 30 of the patient and subgingival surface 28 of tooth 18a to be restored. In other examples, technique 100 includes displacing, with mold body 12, a portion of gingiva 30 of the patient proximate to tooth 18a to be restored. Additionally, or alternatively, technique 100 may include displacing a portion of gingiva 30 proximate to tooth 18a and/or tooth 18b or 18c adjacent to tooth 18a to be restored using a wedging member, such as wedging member 88 of FIGS. 5D-5G.

In some examples, the technique shown in FIG. 6 may also include positioning a second mold body over tooth 18a to be restored. The second mold body may align with a second portion of a surface of tooth 18a to be restored, and may be configured to combine with tooth 18a to define a second mold cavity encompassing at least a second portion of desired tooth structure of tooth 18a to be restored. Example second mold bodies may include any of the mold bodies described in International Application No. PCT/US17/43721, International Publication No. WO 2016/094272 A1, and International Publication No. WO 2017/106419, which are incorporated herein by reference in their entireties. In some examples, the second portion of desired tooth structure may include an interproximal, a facial, a lingual, an incisal, and/or an occlusal surface of tooth 18a. The second mold cavity may be filled with restorative material and cured. In some examples, the technique includes injecting the restorative material through an injection port or another opening, and into the second mold cavity. Additionally, or alternatively, the technique may include prefilling the second mold cavity before positioning the second mold body over tooth 18a and/or placing the restorative material on tooth 18a before positioning the second mold body over tooth 18a. In some examples, the second mold body may be at least partially formed by restorative dental material. The restorative material in the second mold cavity may then be cured and at least a portion of the second mold body may be removed from tooth 18a.

Figure 7:
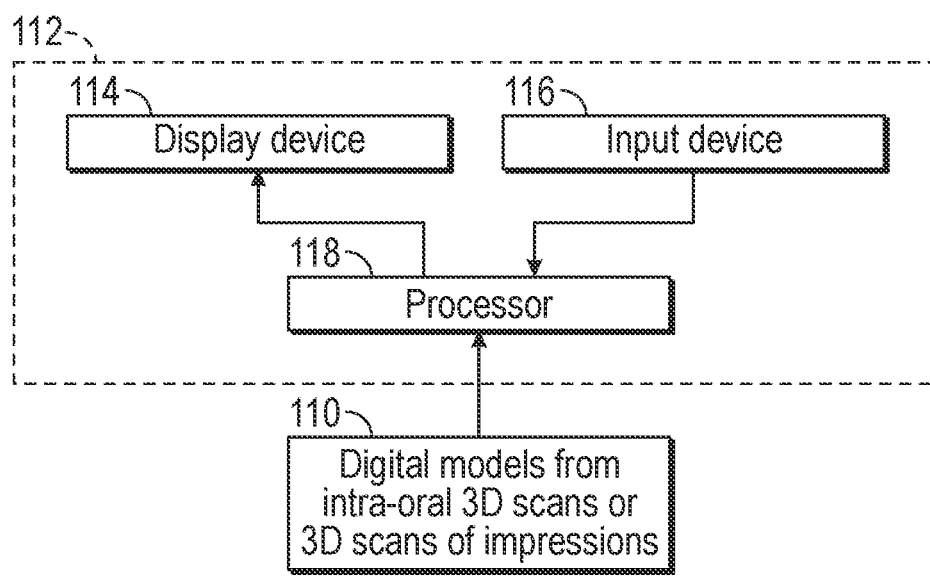
FIG. 7 is a functional block diagram of an example system that may be used to design any of the customized tools of FIGS. 1A-4C.

FIG. 7 is a functional block diagram of an example system that may be used to design any of the tools of FIGS. 1A-4C. System 112 includes display device 114, user input device 116, and processor 118. Processor 118 may include, for example, one or more processors, such as one or more microprocessors, digital signal processors (DSPs), general purpose microprocessors, application specific integrated circuits (ASICs), field-programmable gate arrays (FPGAs), programmable logic circuitry, equivalent discrete or integrated logic circuitry, or the like as well as any combination of such components. Accordingly, the term "processor," as used herein may refer to "processing circuitry," any of the foregoing structures, and/or any other structure suitable for implementation of the techniques described herein. In addition, in some aspects, the functionality described herein may be provided within dedicated hardware and/or software modules. Also, the techniques could be fully implemented in one or more circuits or logic elements. In general, system 112 may include any suitable arrangement of hardware (e.g., circuitry), alone or in combination with software and/or firmware, to perform the various techniques described herein. Processor 118 may be housed in a variety of devices including, for example, one or more supercomputers, servers, personal computers, tablets, mobile phones, and/or other mobile devices.

Display device 114 is configured to present information to a user, e.g., under the control of processor 118. Input device 116 may include a button or keypad, a speaker for voice commands, a mouse or touchpad for moving a cursor or providing input, and the like. In some examples, display device 114 may be a touch screen, and may also act as an input device 116.

Although not shown in FIG. 7, system 112 may also include a memory configured to store instructions required to perform tasks attributed to system 112. The memory may include any suitable memory, such as random access memory (RAM), read only memory (ROM), programmable read only memory (PROM), erasable programmable read only memory (EPROM), electronically erasable programmable read only memory (EEPROM), flash memory, including executable instructions for causing the one or more processors to perform the actions attributed to system 112 herein.

A practitioner may use system 112 to select and define one or more customized tools (e.g., any of the customized tools of FIGS. 1A-4C described herein) using a digital 3D model based upon intra-oral 3D scans, 3D scans of impressions or models of teeth, 2D scan data of teeth, a tooth structure model specific to the patient or not patient-specific, or the like. The practitioner can then use system 112 to design the desired tooth structure of an individual patient. Processor 118 may be configured to receive digital 3D scan data of a supragingival tooth structure of a patient and information relating to a subgingival tooth structure of a patient from intra-oral scans, scans of impressions of teeth, 2D scan data of teeth, medical images, and/or tooth structure model that provides calculated data of patient tooth structure (110). Example systems that can be used to generate digital 3D images or models based upon image sets from multiple views are described in U.S. Pat. Nos. 7,956,862 and 7,605,817. These systems can use an intra-oral scanner to obtain digital images from multiple views of teeth or other intra-oral structures, and those digital images are processed to generate a digital 3D model representing the scanned teeth, which can be modified to generate a digital 3D model representing desired tooth structure of the patient.

In some examples, calculated data of subgingival tooth structure of a patient may be easier to obtain than intra-oral 3D scans, 3D scans of impressions or models of teeth, 2D scan data of teeth relating to subgingival tooth structure of a patient, and/or a medical image (e.g., x-ray or computed tomography (CT)) relating to subgingival tooth structure of a patient. For example, the tooth structure model providing calculated data of subgingival tooth structure may be already generated and stored, such that it may be more efficient to access the tooth structure model of subgingival tooth structure rather than generate it for the particular patient via a patient-specific scan or medical image. In some such examples, a technique to obtain synthetic subgingival tooth structure, such as root structure, may be used to obtain the calculated data of the subgingival tooth structure of the patient. The calculated data, in some examples, may be based on at least one or a characteristic, a measurement, scan data, or medical image of the patient. For example, the calculated data may be based on scan data relating to the supragingival surface of the patient's teeth. Example systems that can be used to generate synthetic subgingival tooth structure are described in commonly assigned International Publication No. WO/2017/106419, which was filed on Dec. 15, 2016 and is entitled, "ONE PIECE DENTAL RESTORATION MOLDS."

In some examples, desired tooth structure of an individual patient defining an emergence profile may be designed based on standard tooth structures and may be modified to reflect specific desired tooth structure of a particular patient. For example, standard tooth structure of a similar size to the tooth structure of the patient may be used to determine a taper angle, a width, a depth, a height, or the like of the desired emergence profile. Additionally, or alternatively, wax dental models of existing tooth structure of the patient may be formed and the desired emergence profile may be manually added to the wax dental model, e.g., by adding additional wax, to create a desired emergence profile for the patient. In some cases, a scanning technique may be used to capture the desired emergence profile of the wax dental model to obtain information to be used with a computing device. In yet another example, a computing device may be used to manipulate a model of existing tooth structure of the patient into the desired tooth structure, and may compare the desired tooth structure to the existing tooth structure to define one or more characteristics of the desired emergence profile for the individual patient. Patient teeth may vary in geometry and size, as well as proximity to adjacent teeth. Thus, modifying a standard tooth structure emergence profile to customized fit with a particular patient's tooth may result in a dental restoration that is more aesthetically pleasing and more functional.

Figure 8:
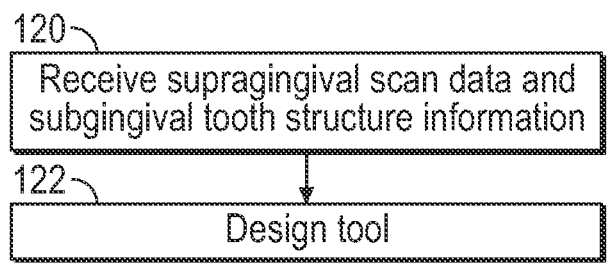
FIG. 8 is a flow diagram illustrating an example method of designing any of the customized tools of FIGS. 1A-4C.

FIG. 8 is a flow diagram illustrating an example method of designing any of the customized tools of FIGS. 1A-4C. Although FIG. 8 is described with respect to system 112 shown in FIG. 7, the method may be performed by another system, along or in combination with system 112, in other examples. The method may include receiving, by processor 118, digital 3D scan data of a supragingival tooth structure of a patient and information relating to a subgingival tooth structure of a patient from intra-oral scans, scans of impressions of teeth, 2D scan data of teeth, medical images, wax dental models, physical examinations, and/or calculated data of tooth structures (120). The method may further include designing, by processor 118, a tool for forming the desired tooth structure of the particular patient based on the digital 3D scan data of the supragingival tooth structure of the patient and the information relating to the subgingival tooth structure of the patient (122). The customized tool may be any of the example customized tools described herein. Processor 118 is configured to design one or more desired tooth structures prior to designing the tool. In this way, processor 118 designs the tool based on the one or more desired tooth structures. Designing the customized tool includes designing a predefined, patient specific mold body that defines desired tooth structure for an individual patient. Additionally, designing the customized tool may include incorporating any the features described herein that are not based solely on the desired tooth structure of the particular patient such as, for example, injection ports, gripping mechanisms, openings, or other features that may improve the functionality of the customized tool.

In some examples, the method may further include controlling, by processor 118, a 3D printer to define the tool. For example, the tool may be printed from Accura® ClearVue resin (a clear plastic) or Accura® 60 resin on the 3D Systems Viper™ printer, available from 3D Systems of Rock Hill, South Carolina. In some examples, the method may further include manufacturing the tool by a CAD/CAM milling processes. In other examples, the method may include manufacturing the tool using a vacuum forming process.

Customized tool design is facilitated by creation of a target restoration design or desired tooth structure. Commercial design software, such as that available from Exocad® of Darmstadt, Germany, may be used to create a target restoration, optionally review the proposed design with the practitioner, and then use a combination of CAD design, part libraries and/or Boolean operation to create the design of the customized tool. In some examples, standard tooth structures, standard emergence profiles, and/or information relating to previous dental restorations may additionally be used to create the desired tooth structure of a particular patient.

In some examples, the method may further include controlling, by processor 118, a device to process at least a portion of a surface of the customized tool to facilitate removal of the customized tool from a dental restoration after curing of the dental restoration and/or a smooth finish of at least one surface of the dental restoration. For example, controlling the device to process the portion of the surface of the customized tool may include controlling the device to polish the portion of the surface to result in the portion of the surface being smoother than before polishing. As another example, controlling the device to process the portion of the surface of the customized tool includes controlling the device to coat the portion of the surface with a material, such as methacrylate resin, and curing the portion of the surface to result in the portion of the surface being smoother than before coating. As another example, controlling the device to process the portion of the surface of the customized tool may include controlling the device to coat the portion of the surface with a material (e.g., Rubber Sep® Release Agent from Taub Products of Jersey City, New Jersey) to result in the portion of the surface having less adhesion force with restorative material than before coating.

When leveraging additive manufacturing technologies to fabricate the customized tools described herein, layer lines may be visible on the surface of the customized tool and thus transferred to the restoration created with the customized tool. These layer lines may result in the practitioner spending additional time smoothing the final restoration to achieve an acceptable surface finish. Thus, by polishing and/or coating the surface of the customized tool, the layer lines can be removed and leave a smoother surface finish to the restoration.

Additionally, polishing and/or coating the surface of the customized tool may increase the visibility through the customized tool due to the reduced scattering of light from the rough surfaces. Visual feedback and light transmission for curing are increased when the light scattering is reduced. Reducing the surface roughness of the mold cavity also reduces the mechanical interlocking of the restorative to the mold face. This allows for lower release forces to remove the mold body, improving reliability of the process.

Figure 9:
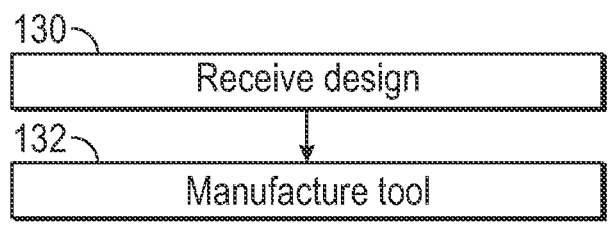
FIG. 9 is a flow diagram illustrating an example method for forming any of the customized tools of FIGS. 1A-4C.

FIG. 9 is a flow diagram illustrating an example method for forming any of the tools of FIGS. 1A-4C. The method may include receiving a design for a customized tool for forming the dental restoration of the tooth (130). The method may further include manufacturing the customized tool based on the received design (132). In some examples, manufacturing the customized tool includes manufacturing the customized tool by a CAD/CAM milling processes. In some examples, manufacturing the customized tool includes 3D printing the customized tool. In other examples, manufacturing the customized tool includes a vacuum forming process, examples of which are described with reference to FIGS. 10A-12B. In some examples, the method may further include processing one or more portions of one or more surfaces of the customized tool as described with reference to FIG. 8.

Figure 10A:
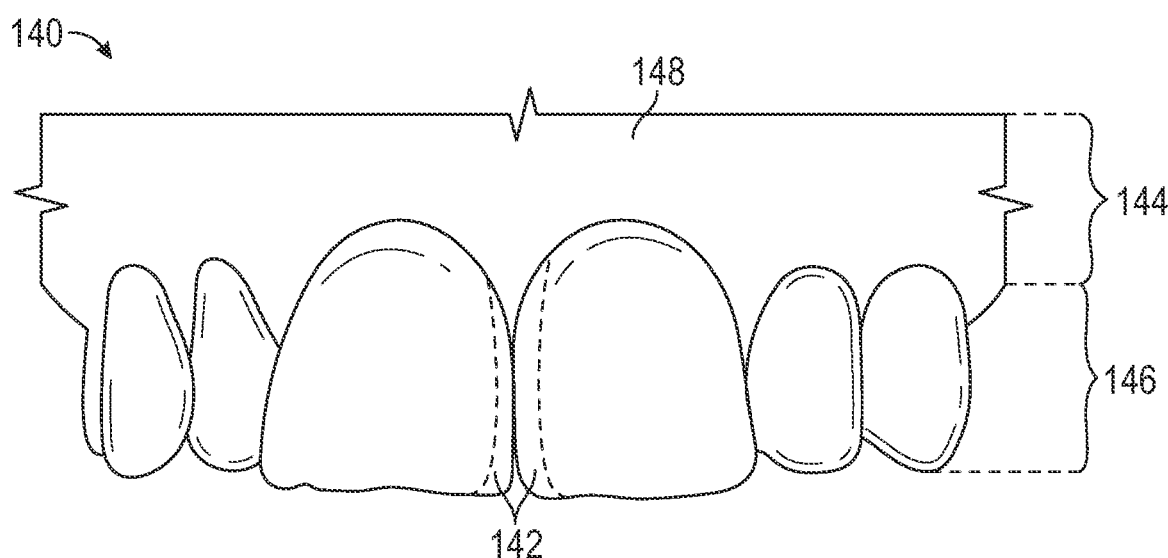
FIGS. 10A and 10B illustrate an example film on a dental model of a desired tooth structure of a patient, where the film and the dental model may be used to form any of the customized tools of FIGS. 1A-4C.
Figure 10B:
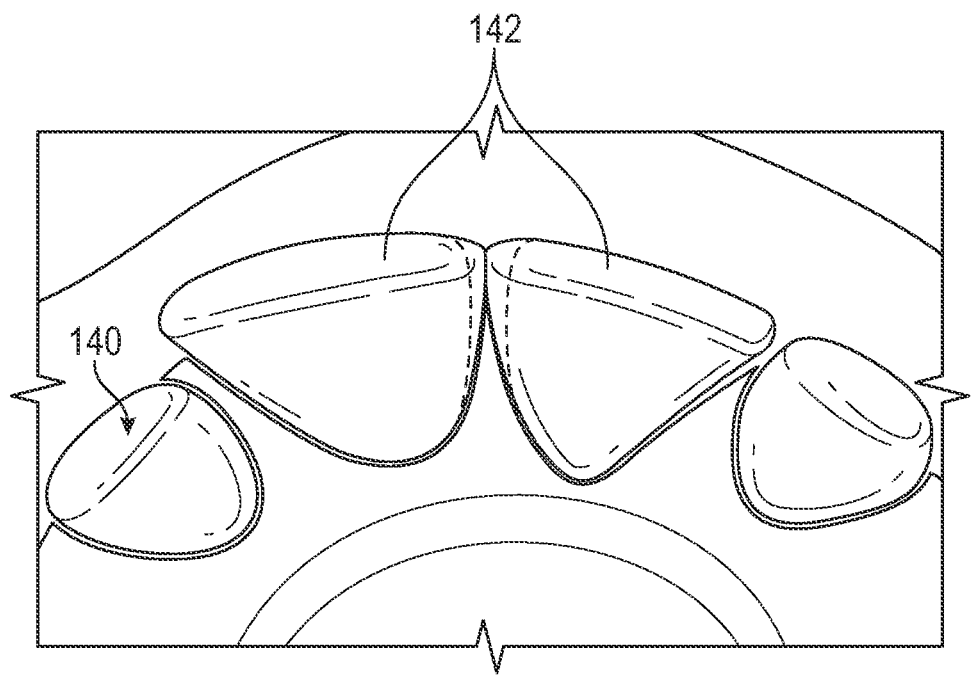

FIGS. 10A and 10B illustrate an example film 142 on a patient-specific dental model 140 of a desired tooth structure of an individual patient, where film 142 and dental model 140 may be used to form any of the customized tools of FIGS. 1A-4C. For example, film 142 and patient-specific dental model 140 may be used in a vacuum forming process to manufacture any part or whole of the customized tools described herein. Although described with respect to manufacturing a customized tool using a vacuum forming process, film 142 and/or patient-specific dental model 140, in some examples, may be used to manufacture the customized tools described herein using another process. For example, a chemically curable material, such as, but not limited to, Imprint™ 4 VPS Impression Material (available from 3M of Saint Paul, Minnesota), Express™ STD VPS Impression Material (a dental putty available from 3M of Saint Paul, Minnesota), or RSVP Clear Silicone Matrix material (available from Cosmedent of Chicago, Illinois), can be deposited on patient-specific dental model 140, cured, and removed from patient-specific dental model 140 to define any of the customized tools described herein.

Patient specific dental model 140 may be designed using any suitable technique, such as based on 3D intra-oral scans, 3D scans of impressions of teeth, 2D scan data of teeth or impressions of teeth, medical images, wax dental model, and/or calculated data of tooth structure. Regardless of how patient-specific dental model 140 is designed, patient-specific dental model 140 represents the desired tooth structure of a particular patient. For example, desired supragingival portion 146 of teeth in patient-specific dental model 140, e.g., the portion of the patient's desired tooth structure above gingiva 148, may be designed using a 3D scan of the patient's tooth structure, and desired subgingival portion 144 of the teeth in patient-specific dental model 140, such as the desired root of the patient's teeth under gingiva 148, may be designed using calculated data of the patient's tooth structure. As shown in FIGS. 10A and 10B, patient-specific dental model 140 may also include the structure of the patient's desired gingiva 148. The configuration of desired gingiva 148 (e.g., its position relative to the teeth) may be determined using any suitable technique, such as, but not limited to, 3D intra-oral scans, 3D scans of impressions of teeth, 2D scan data of teeth or impressions of teeth, medical images, wax dental models, and/or calculated data of tooth structure. In some examples, patient-specific dental model 140 is designed using one or more processors.

Patient-specific dental model 140 may be built using any suitable technique. For example, patient-specific dental model 140 or portions of patient-specific dental model 140 may be 3D printed, CAD/CAM milled, built from an impression of a patient's existing tooth structure and modified to reflect desired tooth structure, or the like. In some examples, portions of patient-specific dental model 140 may be formed separately. In an example, desired supragingival portion 146 and desired subgingival portion 144 may be formed separately from desired gingiva 148 and subsequently mechanically connected.

Patient-specific dental model 140 representing the desired tooth structure of the particular patient may be used to form any part of the customized tools of FIGS. 1A-4C to result in the customized tool being in the final form or close to the final form of the customized tool to form a mold cavity with the patient's existing tooth structure that encompasses the desired tooth structure of the individual patient. In some examples, patient-specific dental model 140 may be configured to behave similarly to the patient's true tooth structure, e.g., may move in the same manner under the application of force. In some examples, patient-specific dental model 140 may be adjusted to compensate for various steps in the manufacturing procedure and/or based on the use of the customized tool. For example, patient-specific dental model 140 may be adjusted to compensate for the thickness of film 142 used to manufacture the customized tool, e.g., patient-specific dental model 140 may include additional space between the desired tooth structures to be able to fit film 142.

In some examples, patient-specific dental model 140 may define one or more vents or through holes (not shown). The vents or through holes may allow patient-specific dental model 140 to be used in a vacuum forming process to manufacture the customized tools described herein. In other examples, patient-specific dental model 140 may be configured in other ways to allow for use in vacuum forming processes.

To manufacture one of the customized tools as described herein, film 142 may be applied to patient-specific dental model 140. For example, film 142 may be wrapped around one or more teeth of patient-specific dental model 140 to encompass a desired transition from supragingival portion 146 of at least one tooth to subgingival portion 144 of the at least one tooth. In some examples, film 142 may be polyethylene terephthalate glycol-modified (PETG), polyurethane, silicone, polyether, or the like. In some examples, film 142 may any thickness that enables film 142 to be used in a vacuum forming process. For example, film 142 may be between about 0.25 mm and about 1.0 mm.

Film 142 may then be formed around patient-specific dental model 140 using a vacuum forming process to manufacture one of the customized tools as described herein. The vacuum forming process may result in film 142 closely conforming the shape of one or more tooth structures defined by patient-specific dental model 140. For example, film 142, after being vacuum formed, may be able to combine with existing tooth structure of the patient to form a mold cavity encompassing at least a portion of desired supragingival tooth structure of the at least one tooth to be restored. In some examples, another process, such as the process described with respect to FIG. 11, may be used to form the part of the customized tool defining a subgingival tooth structure, such as a transition from a supragingival surface of the at least one tooth to a subgingival surface of the at least one tooth. This part of the customized tool may then be attached to the part of the tool formed using the film 142. Further, in some examples, film 142 or another film may be vacuum formed and used to represent adjacent tooth structure, such as, for example, a registration surface to ease the use of the tool during the dental restoration.

In some examples, the vacuum forming process described herein may result in a customized tool or a portion of a customized tool including excess vacuum formed film, e.g., additional film unnecessary for the proper use of the customized tool. In some such examples, the excess vacuum formed film may be trimmed off the customized tool or the portion of the customized tool to create the final shape of the customized tool or portion of the customized tool.

In some examples, other structures may be attached to the customized tool formed by the vacuum forming process. For example, a gripping member may be attached to the customized tool to ease handing of the customized tool by the practitioner. In another example, a registration member may be attached to the customized tool to help facilitate alignment of the customized tool with the tooth to be restored, adjacent teeth, or a structure other than the teeth of the patient. In some examples, gripping members and/or registration members may ease the use of the customized tool formed by the vacuum forming process.

Figure 11:
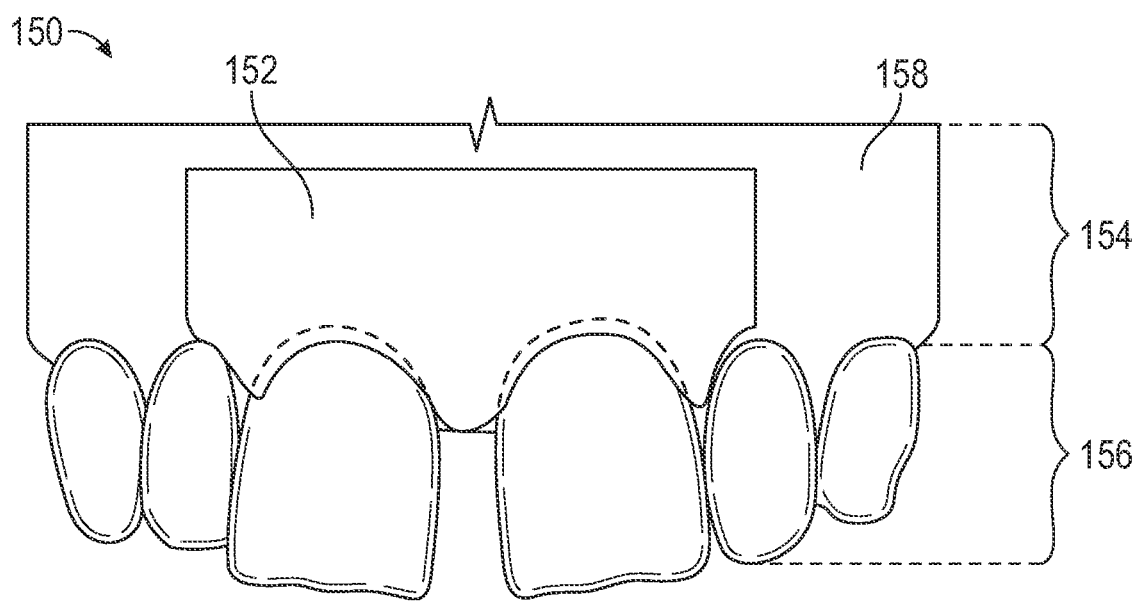
FIG. 11 illustrate another example film on a dental model of a desired tooth structure of a patient, where the film and the dental model may be used to form any of the customized tools of FIGS. 1A-4C.

FIG. 11 illustrates another example film 152 on a patient-specific dental model 150 of desired tooth structure of a particular patient, where film 152 and patient-specific dental model 150 may be used to form at least a portion of the customized tools of FIGS. 1A-4C. For example, film 152 and patient-specific dental model 150 may be used in a vacuum forming process to manufacture at least a portion of the customized tools described herein. Although described with respect to manufacturing a tool using a vacuum forming process, film 152 and/or patient-specific dental model 150, in some examples, may be used to manufacture the tools described herein using another process. For example, a chemically curable material, such as Imprint™ 4 VPS Impression Material (available from 3M of Saint Paul, Minnesota), Express™ STD VPS Impression Material (available from 3M of Saint Paul, Minnesota), or RSVP Clear Silicone Matrix material (available from Cosmedent of Chicago, Illinois), can be deposited on patient-specific dental model 150, cured, and removed from patient-specific dental model 150 to define at least a portion of a customized tool described herein. Film 152 and patient-specific dental model 150 may be the same or substantially the same as film 142 and patient-specific dental model 140, respectively, of FIGS. 10A and 10B. Additionally, in some examples, the vacuum forming process of FIG. 11 may be the same or substantially the same that described with respect to FIGS. 10A and 10B.

As seen in FIG. 11, film 152 has been formed around desired gingiva 158 rather than around one or more desired tooth structures of patient-specific dental model 150. In some examples, film 152 may extend between desired subgingival portion 154 and desired gingiva 158 of patient-specific dental model 150 to encompass at least a portion of a desired transition from supragingival portion 156 to subgingival portion 154 of patient-specific dental model 150. In some such examples, film 152 may encompass the portion of the transition that includes subgingival portion 154, and an additional tool that encompasses desired supragingival portion 156 of the transition may be formed separately from film 152. In some examples, the desired tooth structures 154, 156 may be able to be removed from desired gingiva 158 of patient-specific dental model 150 so that film 152 can be formed to all or a portion of a periodontal pocket defined by desired gingiva 158 of patient-specific dental model 150.

In some examples, excess vacuum formed film may be trimmed of the tool formed by film 152. Additionally, or alternatively, other structures, such as a gripping member and/or a registration member, may be attached to the tool formed by film 152.

Figure 12A:
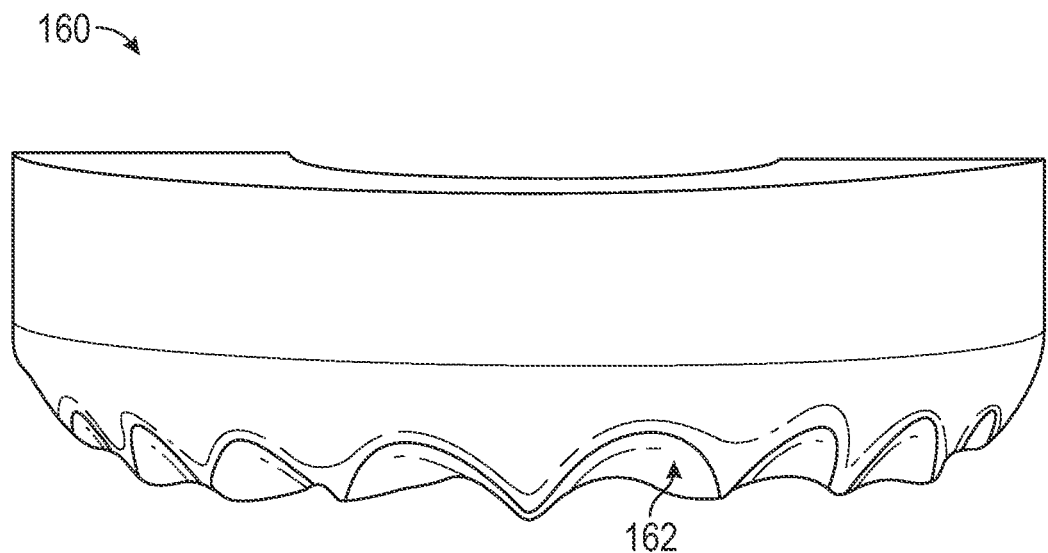
FIGS. 12A and 12B are example views of a gingival dental model of a patient, which may be used in some examples to form any of the customized tools of FIGS. 1A-4C.
Figure 12B:
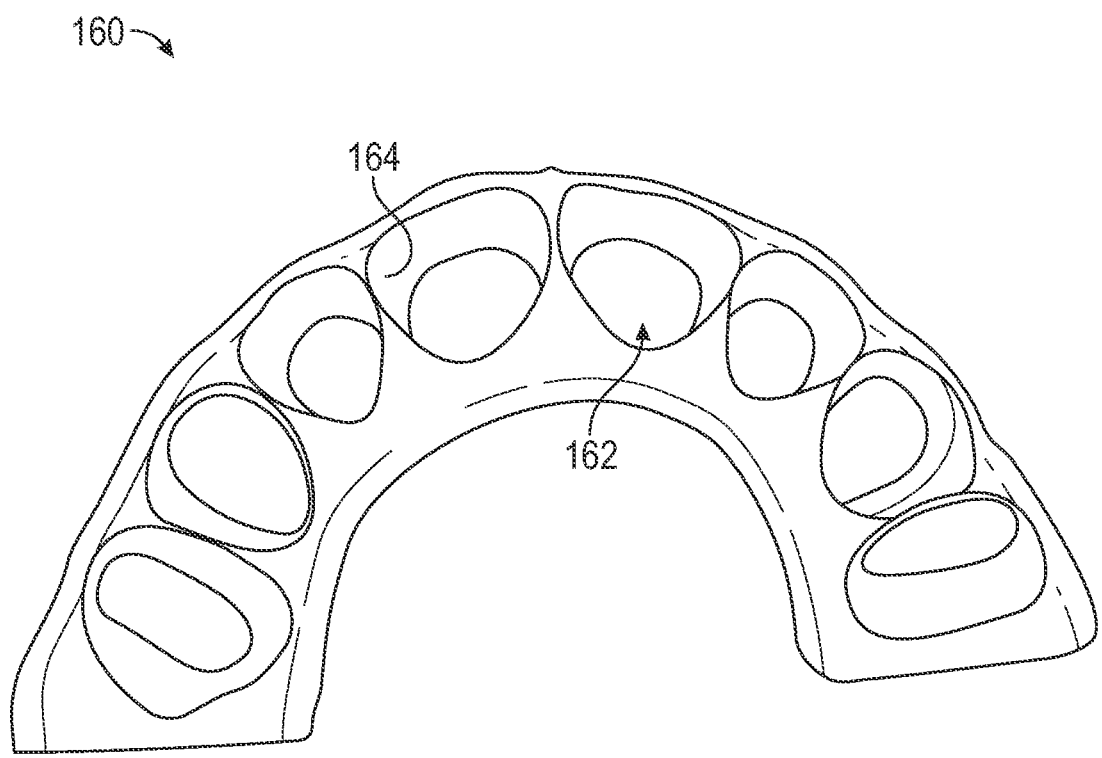

FIGS. 12A and 12B are example views of a patient specific gingival dental model 160 of a patient, which may be used in some examples to form at least a portion of the customized tools of FIGS. 1A-4C. Patient-specific gingival dental model 160 may be similar to desired gingiva 148 of patient-specific dental model 140 of FIGS. 10A and 10B or desired gingiva 158 of patient-specific dental model 150 of FIG. 11. For example, patient-specific gingival dental model 160 may be any of the patient-specific dental models described herein not including tooth structures.

Patient-specific gingival dental model 160 may define a periodontal pocket 162 for at least the one or more teeth of the patient to be restored using a customized tool described herein. For example, a desired subgingival portion of a dental model including desired tooth structures may be configured to fit into each periodontal pocket 162. Periodontal pocket 162 may also include desired structure of the gingiva 164 that would surround a desired subgingival portion of a particular patient's tooth structure. In some examples, patient-specific gingival dental model 160 may be useful for the design and/or placement of a mold body on a respective tooth.

In some examples, patient-specific gingival dental model 160 may be used with a vacuum forming process as described herein to manufacture at least a portion of the customized tools of FIGS. 1A-4C. For example, patient-specific gingival dental model 160 may be used to form a customized tool similar to the customized tool of FIG. 11 by vacuum forming a film around periodontal pocket 162. The resulting configuration of the vacuum formed film may inform the characteristics for a desired tooth structure to be restored, such as, for example, the configuration (e.g., size, depth, angle relative to the rest of a mold body, and the like) of subgingival portions 32 of mold body 12 shown in FIGS. 2A-2C.

Modifications to the described examples may be made within the spirit of this disclosure. Tools can fit precisely to the existing structure or can be optimized to selectively move or position tissue. Custom tools may be formed to generate a digitally optimized tooth structure that may result in the practitioner removing tooth structure prior to application of the tool. Such plans can be communicated to the practitioner via images, digital models, and/or reduction copings. Tools can be printed, milled, or vacuum formed. Tools can be made of a full range of materials (strength, flexibility, translucency, color). Tools can be coated with a range of agents to locally enhance sealing, optimize release, surface finish, and optical transparency. Tools can contain features to indicate or define fill level of different restorative materials (shade, fill level, physical properties). Tools can include visual indicators to designate the proper location of in the mouth of the patient to place the tool, the order in which multiple tools are to be used, portions of the tool configured to form at least a portion of the dental restoration, or the like.

Physical characteristics (elasticity, roughness, transparency, and the like) of tools can vary across the tool to improve sealing capability, dimensional fidelity, texture imparted to restorative material, degree of cure of material, etc.). Tools and/or mold bodies can interlock with each other or with standard components (e.g., matrix bands, wedges, and the like). Tools can be used inside or outside of the mouth of a patient. Restorative material may be placed or injected through injection ports or openings in tools, applied to tooth structure and/or the tool prior to the application of the tool, such that application shapes the material. Tools or a portion of the tools can be formed from restorative material, pigmented, and/or coated with release agents such that at least part of the tool forms the dental restoration. Tools can be degradable (e.g. by solvent/heat) to release from the restorative material or enable undercut geometries and/or reduce parting lines. Tools could be collapsible (deflated, frangible, etc.). Kits can be created of the patient specific tools and associated products and quantities, (e.g. adhesives, filling, and polishing materials selected for the patient needs and/or practitioner preferences). Series of tools may be used sequentially in the direct filling process in order to control the geometries of multiple layers of a dental restoration on a tooth.

Dental scans may be taken at any suitable time, such as at diagnostic appointment to facilitate custom tools fabrication prior to a dental restoration appointment. Tools may be manufactured locally or digital scan data may be sent to a remote location for production. Acquisition of patient supragingival and subgingival data/information, creation of a treatment plan, creation of a predefined, patient-specific tool design, and fabrication of the customized tool may be completed in any combination of geographic locations including, for example, a dental office, a dental laboratory, and/or an industrial facility.

Various examples have been described. These and other examples are within the scope of the following claims.

What is claimed is:

1. A tool for forming a dental restoration, the tool comprising:
a preformed mold body configured to provide a patient-specific, customized fit with at least one tooth to be restored of a patient, the mold body configured to align with a portion of a surface of the at least one tooth,
the mold body being configured to combine with the at least one tooth to define a mold cavity encompassing at least a portion of desired tooth structure of the at least one tooth to be restored of the patient,
wherein the mold body comprises a first registration arm projecting in a generally mesial-distal direction from a first side of the mold body, wherein the first registration arm is configured to align with at least a portion of an occlusal or an incisal surface of a first tooth adjacent to the at least one tooth to be restored and a second registration arm projecting in a generally mesial-distal direction from a second side of the mold body, wherein the second registration arm is configured to align with at least a portion of an occlusal or an incisal surface of a second tooth also adjacent to the at least one tooth to be restored.

2. The tool of claim 1, wherein the desired tooth structure of the at least one tooth to be restored defines a tooth structure that tapers from a supragingival surface of the at least one tooth to a subgingival surface of the at least one tooth.

3. The tool of claim 1, wherein the mold body is configured to contact at least a portion of a subgingival surface of the at least one tooth to concentrate sealing pressure at least a portion of a perimeter of the mold cavity.

4. The tool of claim 1, wherein a subgingival surface of the at least one tooth comprises a root of the at least one tooth.

5. The tool of claim 1, wherein the mold body is configured to extend between a portion of gingiva of the patient and a subgingival surface of the at least one tooth to be restored.

6. The tool of claim 1, wherein the mold body is configured to displace a portion of gingiva of the patient proximate to the at least one tooth to be restored when the mold body is positioned over the at least one tooth to define the mold cavity.

7. The tool of claim 1, wherein the portion of desired tooth structure of the tooth to be restored further comprises at least a portion of an interproximal surface of the at least one tooth.

8. The tool of claim 1, wherein the mold body defines an injection port.

9. The tool of claim 1, wherein the mold body comprises a gripping member.

10. The tool of claim 1, wherein the mold body comprises a wedging member configured to displace a tooth adjacent to the at least one tooth to be restored when the mold body is positioned over the at least one tooth to define the mold cavity.

11. The tool of claim 1, wherein the mold body is configured to align with a second portion of a surface of the at least one tooth to be restored, the mold body being configured to combine with the at least one tooth to define a second mold cavity encompassing at least a second portion of desired tooth structure of the at least one tooth to be restored of the patient, wherein the second portion of desired tooth structure of the at least one tooth to be restored comprises at least a second transition from a second supragingival surface of the at least one tooth to a second subgingival surface of the at least one tooth.

12. The tool of claim 1, wherein the mold body comprises an opening proximate an incisal or occlusal surface of the at least one tooth to be restored.

13. The tool of claim 1, wherein the mold body comprises a release film or coating configured to facilitate release of restorative material from the surface of the mold body.

14. The tool of claim 1, wherein at least a portion of the mold body is made of restorative material.

15. The tool of claim 1, wherein the at least one of the first and second registration arms is configured to align with at least a portion of an incisal surface of the tooth adjacent to the at least one tooth to be restored.

16. The tool of claim 2, and wherein at least a portion of the subgingival portion extends from a facial region of the tooth to be restored, through the interproximal surfaces, to a lingual region of the tooth to be restored.

17. The tool of claim 1, wherein the tooth adjacent to the at least one tooth to be restored is not to be restored.

18. The tool of claim 2 further including a subgingival portion that provides a smooth transition from the supragingival surface of the at least one tooth to the subgingival surface of the at least one tooth.

19. The tool of claim 1, wherein the first registration member and the second registration arms extend away from the mold body along a substantially horizontal path.

20. The tool of claim 1, wherein the mold body is a preformed one-piece mold body.

21. A tool for forming a dental restoration, the tool comprising:
a preformed mold body configured to provide a patient-specific, customized fit with at least one tooth to be restored of a patient, the mold body configured to align with a portion of a surface of the at least one tooth,
the mold body being configured to combine with the at least one tooth to define a mold cavity encompassing at least a portion of desired tooth structure of the at least one tooth to be restored of the patient,
wherein the mold body comprises at least one registration arm projecting in a generally mesial-distal direction from a first side of the mold body, wherein the first registration arm is configured to align with at least a portion of an occlusal or an incisal surface of a first tooth adjacent to the at least one tooth to be restored,
subgingival portions forming a perimeter of the mold cavity that extends adjacent a subgingival surface of the at least one tooth to be restored, and wherein at least a portion of the subgingival portions extends from a facial region of the tooth to be restored, through the interproximal surfaces, to a lingual region of the tooth to be restored.

22. The tool of claim 21, wherein a subgingival surface of the at least one tooth comprises a root of the at least one tooth.

23. The tool of claim 21, wherein the portion of desired tooth structure of the tooth to be restored further comprises at least a portion of an interproximal surface of the at least one tooth.

24. The tool of claim 21, and wherein the subgingival portion is configured to contact at least a portion of the subgingival surface of the at least one tooth to concentrate sealing pressure at least a portion of a perimeter of the mold cavity.

* * * * *